United States Patent
Kojima et al.

[19]

[11] Patent Number: 6,058,412

[45] Date of Patent: May 2, 2000

[54] SERVICE MANAGEMENT SYSTEM AND PROCESS CONTROL SYSTEM FOR INTELLIGENT NETWORK SYSTEM

[75] Inventors: Takashi Kojima, Yokohama; Masashi Nakano, Tokyo; Shouichi Kimura, Yokohama; Yoshikazu Takeda, Yokohama; Miki Kidachi, Yokohama; Akira Nagasawa, Yokohama; Yayoi Ito, Yokohama, all of Japan

[73] Assignee: Fujitsu Limited, Kanagawa, Japan

[21] Appl. No.: 08/999,181

[22] Filed: Dec. 29, 1997

[30] Foreign Application Priority Data

Jun. 20, 1997 [JP] Japan .................................. 9-164620

[51] Int. Cl.[7] ...................................................... G06F 9/00

[52] U.S. Cl. .......................................... 709/100; 709/102

[58] Field of Search ...................................... 709/100, 104, 709/108, 102, 103; 379/113, 34, 739, 88.2, 232; 445/461; 701/117

[56] References Cited

U.S. PATENT DOCUMENTS

| | | | |
|---|---|---|---|
| 4,979,118 | 12/1990 | Kheradpir | 701/117 |
| 5,353,331 | 10/1994 | Emery et al. | 455/461 |
| 5,425,086 | 6/1995 | Hidaka et al. | 379/113 |
| 5,586,171 | 12/1996 | McAllister et al. | 379/67 |
| 5,742,905 | 4/1998 | Pepe et al. | 455/461 |
| 5,790,548 | 8/1998 | Sistanizadeh et al. | 370/401 |

*Primary Examiner*—Majid A. Banankhah
*Attorney, Agent, or Firm*—Helfgott & Karas, PC.

[57] ABSTRACT

A service management system is adapted to an intelligent network system having a plurality of service switching points making service inquiries, and a plurality of service control points coupled to the service switching points and controlling services. The service management system is coupled to the plurality of service control points and centrally manages databases of the service control points, and includes a process registration information table for registering process information of a plurality of processes related to the service control points and the service management system. The process registration information table is used to manage contention among the processes.

12 Claims, 25 Drawing Sheets

FIG. 10

| CONTENTION REGISTRATION REQUEST \ PROCESS SUBJECT TO REGISTRATION | Editor 1 | SSC/SLP Ins 2 | SSC/SLP Add 3 | DB Audit 4 | Backup 5 | Restor 6 | Version Mng 7 | DB Loading 8 | Service Stat 9 | DB Audit 10 | Quantity 11 | DAT 12 | SCP 1 13 | SCP 2 14 | SMS-ID 15 | |
|---|---|---|---|---|---|---|---|---|---|---|---|---|---|---|---|---|
| PROCESS NAME: PROCESS INTERNAL NUMBER | Editor : 1 | | | | | | | | | | | | | | | • INFORMATION CONVERSION TABLE FOR REQUEST PROCESS |
| PROCESS SUBJECT TO CONTENTION MONITORING | 1 | 0 | 0 | 0 | 0 | 0 | 0 | 1 | 0 | 0 | 0 | 0 | 0 | 0 | 0 | • INSERT 1 TO PROCESS WHICH CHECKS CONTROL UPON REQUEST |
| PROCESS SUBJECT TO SERVICE CONTENTION MONITORING | 1 | 0 | 0 | 0 | 0 | 1 | 0 | 1 | 0 | 0 | 0 | 0 | 0 | 0 | 0 | • INSERT 1 TO PROCESS WHICH CHECKS SERVICE UPON REQUEST |
| PROCESS SUBJECT TO HOST CONTENTION MONITORING | 1 | 0 | 0 | 0 | 0 | 0 | 0 | 1 | 0 | 0 | 0 | 0 | 0 | 0 | 0 | • INSERT 1 TO PROCESS WHICH CHECKS HOST UPON REQUEST |
| PROCESS SUBJECT TO DATA RECORD CONTENTION MONITORING | 1 | 0 | 0 | 0 | 0 | 1 | 0 | 0 | 0 | 0 | 0 | 0 | 0 | 0 | 0 | • INSERT 1 TO PROCESS WHICH CHECKS DATA RECORD UPON REQUEST |
| PROCESS SUBJECT TO PROCESS LEVEL CONTENTION MONITORING | 1 | 0 | 0 | 0 | 0 | 1 | 0 | 1 | 0 | 0 | 0 | 0 | 0 | 0 | 0 | • INSERT 1 TO PROCESS WHICH CHECKS PROCESS LEVEL UPON REQUEST |
| FORCIBLY ENDABLE LEVEL | 0 | | | | | | | | | | | | | | | • WRITE LEVEL IF AUTHORIZED TO FORCIBLY END |
| PROCESS NAME: PROCESS INTERNAL NUMBER | DB Loading : 2 | | | | | | | | | | | | | | | |
| PROCESS SUBJECT TO CONTENTION MONITORING | 1 | 0 | 0 | 0 | 0 | 0 | 1 | 0 | 1 | 1 | 1 | 0 | 0 | 0 | 0 | |
| PROCESS SUBJECT TO SERVICE CONTENTION MONITORING | 1 | 0 | 0 | 0 | 0 | 1 | 0 | 0 | 1 | 0 | 1 | 0 | 0 | 0 | 0 | |
| PROCESS SUBJECT TO HOST CONTENTION MONITORING | 1 | 0 | 0 | 0 | 0 | 0 | 1 | 0 | 1 | 0 | 1 | 0 | 0 | 0 | 0 | |
| PROCESS SUBJECT TO DATA RECORD CONTENTION MONITORING | 1 | 0 | 0 | 0 | 0 | 1 | 0 | 0 | 1 | 1 | 1 | 0 | 0 | 0 | 0 | |
| PROCESS SUBJECT TO PROCESS LEVEL CONTENTION MONITORING | 1 | 0 | 0 | 0 | 0 | 1 | 1 | 0 | 1 | 1 | 1 | 0 | 0 | 0 | 0 | |
| FORCIBLY ENDABLE LEVEL | 0 | | | | | | | | | | | | | | | • WRITE LEVEL IF AUTHORIZED TO FORCIBLY END |
| PROCESS NAME: PROCESS INTERNAL NUMBER | SCP-1 : 13 | | | | | | | | | | | | | | | |
| PROCESS SUBJECT TO CONTENTION MONITORING | 0 | 1 | 1 | 1 | 1 | 1 | 1 | 1 | 1 | 1 | 1 | 0 | 0 | 0 | 0 | |
| PROCESS SUBJECT TO SERVICE CONTENTION MONITORING | 0 | 0 | 0 | 0 | 0 | 0 | 0 | 1 | 0 | 0 | 0 | 0 | 0 | 0 | 0 | |
| PROCESS SUBJECT TO HOST CONTENTION MONITORING | 0 | 0 | 0 | 0 | 0 | 0 | 0 | 1 | 0 | 0 | 0 | 0 | 0 | 0 | 0 | |
| PROCESS SUBJECT TO DATA RECORD CONTENTION MONITORING | 0 | 0 | 0 | 0 | 0 | 0 | 0 | 1 | 1 | 1 | 1 | 0 | 0 | 0 | 0 | |
| PROCESS SUBJECT TO PROCESS LEVEL CONTENTION MONITORING | 0 | 0 | 0 | 0 | 0 | 0 | 0 | 1 | 1 | 1 | 1 | 0 | 0 | 0 | 0 | |
| FORCIBLY ENDABLE LEVEL | 9 | | | | | | | | | | | | | | | • WRITE LEVEL IF AUTHORIZED TO FORCIBLY END |

FIG. 11

| SERVICE INFORMATION | CONVERSION VALUE | | | | | | | | | | | | | | |
|---|---|---|---|---|---|---|---|---|---|---|---|---|---|---|---|
| Group-1 | 0 | 0 | 0 | 0 | 0 | 0 | 0 | 0 | 0 | 0 | 0 | 0 | 0 | 0 | 1 |
| NPS | 0 | 0 | 0 | 0 | 0 | 0 | 0 | 0 | 0 | 0 | 0 | 0 | 0 | 0 | 1 |
| Group-2 | 0 | 0 | 0 | 0 | 0 | 0 | 0 | 0 | 0 | 0 | 0 | 0 | 1 | 1 | 0 |
| ABS | 0 | 0 | 0 | 0 | 0 | 0 | 0 | 0 | 0 | 0 | 0 | 0 | 0 | 1 | 0 |
| ACS | 0 | 0 | 0 | 0 | 0 | 0 | 0 | 0 | 0 | 0 | 0 | 0 | 1 | 0 | 0 |

FIG. 12

| HOST INFORMATION | CONVERSION VALUE | | | | | | | | | | | | | | |
|---|---|---|---|---|---|---|---|---|---|---|---|---|---|---|---|
| Group-1 | 0 | 0 | 0 | 0 | 0 | 0 | 0 | 0 | 0 | 0 | 0 | 0 | 1 | 1 | 1 |
| SCP-1 | 0 | 0 | 0 | 0 | 0 | 0 | 0 | 0 | 0 | 0 | 0 | 0 | 0 | 0 | 1 |
| SCP-2 | 0 | 0 | 0 | 0 | 0 | 0 | 0 | 0 | 0 | 0 | 0 | 0 | 0 | 1 | 0 |
| SCP-3 | 0 | 0 | 0 | 0 | 0 | 0 | 0 | 0 | 0 | 0 | 0 | 0 | 1 | 0 | 0 |
| Group-2 | 0 | 0 | 0 | 0 | 0 | 0 | 0 | 0 | 0 | 0 | 0 | 1 | 0 | 0 | 0 |
| m-sms | 0 | 0 | 0 | 0 | 0 | 0 | 0 | 0 | 0 | 0 | 0 | 1 | 0 | 0 | 0 |
| Group-3 | 0 | 0 | 0 | 0 | 0 | 0 | 1 | 1 | 0 | 0 | 0 | 0 | 0 | 0 | 0 |
| DAT-1 | 0 | 0 | 0 | 0 | 0 | 0 | 0 | 1 | 0 | 0 | 0 | 0 | 0 | 1 | 0 |
| DAT-2 | 0 | 0 | 0 | 0 | 0 | 0 | 1 | 0 | 0 | 0 | 0 | 0 | 1 | 0 | 0 |

FIG. 13

| HOST \ LEVEL | 1 | 2 | 3 | 4 | 5 | 6 | 7 | 8 | 9 | 10 |
|---|---|---|---|---|---|---|---|---|---|---|
| SCP-1 CPU | 0〜10 | 11〜20 | 21〜30 | 31〜40 | 41〜50 | 51〜60 | 61〜70 | 71〜80 | 81〜90 | 91〜100 |
| SCP-2 CPU | 0〜40 | 41〜50 | 51〜60 | 61〜65 | 66〜70 | 71〜75 | 76〜80 | 81〜85 | 86〜90 | 91〜100 |
| m-sms CPU | 0〜50 | 51〜55 | 56〜60 | 61〜65 | 66〜70 | 71〜75 | 76〜80 | 81〜85 | 86〜90 | 95〜100 |
| Editor Registration Request | | | 1 | | | | | | | |
| Editor Level-Up Request | | | | | 1 | | | | | |
| DB Loading Registration Request | | | | | | | | | 1 | |
| Back-Up Registration Request | | | 1 | | | | | | | |
| Restore Registration Request | | | | | 1 | | | | | |
| DB Audit Registration Request | | | 1 | | | | | | | |

FIG. 14

| | |
|---|---|
| ①PROCESS NAME | Editor |
| ②PROCESS INTERNAL NUMBER | 0 0 0 0 0 0 0 0 0 0 0 0 0 0 0 1 |
| ③PROCESS SUBJECT TO CONTENTION MONITORING | 1 0 0 0 0 0 1 0 1 0 0 0 0 0 0 0 |
| ④PROCESS SUBJECT TO SERVICE CONTENTION MONITORING | 1 0 0 0 0 0 1 0 1 0 0 0 0 0 0 0 |
| ⑤PROCESS SUBJECT TO HOST CONTENTION MONITORING | 1 0 0 0 0 0 0 0 1 0 0 0 0 0 0 0 |
| ⑥PROCESS SUBJECT TO DATA RECORD CONTENTION MONITORING | 1 0 0 0 0 0 1 0 0 0 0 0 0 0 0 0 |
| ⑦PROCESS SUBJECT TO PROCESS LEVEL CONTENTION MONITORING | 1 0 0 0 0 0 1 0 0 0 0 0 0 0 0 0 |
| ⑧FORCIBLY ENDABLE LEVEL | 0 |
| ⑨FORCIBLY ENDABLE PROCESS | 0 0 0 0 0 0 0 0 0 0 0 0 0 0 0 0 |
| | DB Loading |
| | 0 0 0 0 0 0 0 0 0 0 0 0 0 0 1 0 |
| | 1 0 0 0 0 0 1 0 1 0 0 0 0 0 0 0 |
| | 1 0 0 0 0 0 1 0 1 0 0 0 0 0 0 0 |
| | 1 0 0 0 0 0 0 0 1 0 0 0 0 0 0 0 |
| | 1 0 0 0 0 0 1 0 1 0 0 0 0 0 0 0 |
| | 1 0 0 0 0 0 1 0 1 0 0 0 0 0 0 0 |
| | 0 |
| | 0 0 0 0 0 0 0 0 0 0 0 0 0 0 0 0 |
| | |
| | SOP-1 |
| | 0 0 1 0 0 0 0 0 0 0 0 0 0 0 0 0 |
| | 0 1 1 1 0 0 1 1 1 1 0 0 0 0 0 0 |
| | 0 1 1 1 0 0 1 1 1 1 0 0 0 0 0 0 |
| | 0 1 1 1 0 0 1 1 1 1 0 0 0 0 0 0 |
| | 0 1 1 1 0 0 1 1 1 1 0 0 0 0 0 0 |
| | 0 1 1 1 0 0 1 1 1 1 0 0 0 0 0 0 |
| | 0 |
| | 0 0 0 1 0 0 1 0 0 0 0 0 0 0 0 0 |
| | |

FIG. 15

| All Services | 0 0 0 0 0 0 0 0 0 0 0 0 0 1 1 1 |
|---|---|
| Group 1 | 0 0 0 0 0 0 0 0 0 0 0 0 0 0 0 1 |
| NPS | 0 0 0 0 0 0 0 0 0 0 0 0 0 0 0 1 |
| Group 2 | 0 0 0 0 0 0 0 0 0 0 0 0 0 1 1 0 |
| AIVS | 0 0 0 0 0 0 0 0 0 0 0 0 0 0 1 0 |
| ACS | 0 0 0 0 0 0 0 0 0 0 0 0 0 1 0 0 |

FIG. 16

| All Hosts | 0 0 0 0 0 0 1 1 1 1 1 1 1 1 1 |
|---|---|
| Group 1 | 0 0 0 0 0 0 0 0 0 0 0 0 1 1 1 |
| SCP-1 | 0 0 0 0 0 0 0 0 0 0 0 0 0 0 1 |
| SCP-2 | 0 0 0 0 0 0 0 0 0 0 0 0 0 1 0 |
| SCP-3 | 0 0 0 0 0 0 0 0 0 0 0 0 1 0 0 |
| Group 2 | 0 0 0 0 0 0 0 0 0 0 0 1 0 0 0 |
| m-sms | 0 0 0 0 0 0 0 0 0 0 0 1 0 0 0 |
| Group 3 | 0 0 0 0 0 0 0 0 0 1 1 0 0 0 0 |
| DAT-1 | 0 0 0 0 0 0 0 0 0 0 1 0 0 0 0 |
| DAT-2 | 0 0 0 0 0 0 0 0 0 1 0 0 0 0 0 |

FIG. 17

| INTERNAL NUMBER | 1 | 2 | 3 | 4 | 5 | 6 | 7 | 8 | 9 | 10 |
|---|---|---|---|---|---|---|---|---|---|---|
| SCP-1 CPU Usage | 0∼10 | 11∼20 | 21∼30 | 31∼40 | 41∼50 | 51∼60 | 61∼70 | 71∼80 | 81∼90 | 91∼100 |
| SCP-2 CPU Usage | 0∼40 | 41∼50 | 51∼60 | 61∼65 | 66∼70 | 71∼75 | 76∼80 | 81∼85 | 86∼90 | 91∼100 |
| m-sms CPU Usage | 0∼50 | 51∼55 | 56∼60 | 61∼65 | 66∼70 | 71∼75 | 76∼80 | 81∼85 | 86∼90 | 95∼100 |
| Editor Registration Request Level | | | 1 | | | | | | | |
| Editor Level-Up Request Level | | | | | 1 | | | | | |
| DB Loading Registration Request Level | | | | | | | | | | 1 |
| DB Back-Up Registration Request Level | | | 1 | | | | | | | |
| DB Restore Registration Request Level | | | | | | | | | | 1 |
| DB Audit Registration Request Level | | | 1 | | | | | | | 1 |

FIG. 18

| | |
|---|---|
| S C P − 1 | PROCESS NAME (S C P − 1) |
| N P S | SERVICE NAME (N P S) |
| s c p − 1 | HOST NAME (s c p − 1) |
| N U L L | DATA RECORD |
| 3 0 % | CPU UTILIZATION RATE |
| N U L L | PROCESS ID |
| N U L L | ADDRESS INFORMATION |

FIG. 19

| | | |
|---|---|---|
| 0 0 1 0 0 0 0 0 0 0 0 0 0 0 0 0 | PROCESS INTERNAL NUMBER(s c p − 1) | ① |
| 0 0 0 0 0 0 0 0 0 0 0 0 0 0 0 1 | SERVICE INTERNAL NUMBER(N P S) | ② |
| 0 0 0 0 0 0 0 0 0 0 0 0 0 0 0 1 | HOST INTERNAL NUMBER (s c p − 1) | ③ |
| N U L L | DATA RECORD | ④ |
| 3 | CONTENTION LEVEL | ⑤ |
| N U L L | PROCESS ID | ⑥ |
| N U L L | ADDRESS INFORMATION OF PROCESS | ⑦ |

FIG. 21

| | |
|---|---|
| Editor | PROCESS NAME (Editor) |
| NPS | SERVICE NAME (NPS) |
| m-sms | HOST NAME (m-sms) |
| NPS00011 | DATA RECORD |
| 30% | CPU UTILIZATION RATE |
| 123456 | PROCESS ID |
| wwwqwwgg | ADDRESS INFORMATION |

FIG. 22

| | | |
|---|---|---|
| 0000000000000001 | PROCESS INTERNAL NUMBER(Editor) | ① |
| 0000000000000001 | SERVICE INTERNAL NUMBER(NPS) | ② |
| 0000000000000100 | HOST INTERNAL NUMBER (m-sms) | ③ |
| NPS00011 | DATA RECORD | ④ |
| 3 | CONTENTION LEVEL | ⑤ |
| 123456 | PROCESS ID | ⑥ |
| wwwqwwgg | ADDRESS INFORMATION OF PROCESS | ⑦ |

SERVICE MANAGEMENT SYSTEM AND PROCESS CONTROL SYSTEM FOR INTELLIGENT NETWORK SYSTEM

BACKGROUND OF THE INVENTION

The present invention generally relates to service management systems and process control systems for intelligent network systems, and more particularly to a service management system and a process control system which controls process contentions in an intelligent network system.

Conventionally, there are intelligent network systems such as a Number Portability Service (NPS) which enables the use of the same telephone number even if a setup position of a telephone set is moved, and an Account Code Service (ACS).

FIG. 1 is a system block diagram showing the system structure of a conventional intelligent network system. In FIG. 1, a plurality of Service Switching Points (SSPs) $10_1$ through $10_4$ which make service inquiries and a Service Control Point (SCP) 12 are coupled via a common line signal network 16. A Service Management System (SMS) 18 manages a database of the SCP 12, and is coupled to a plurality of terminals $20_1$ through $20_n$.

In the conventional intelligent network system, the SMS 18 only controls the database of the single SCP 12, and the process contention control carried out by the SMS 18 is simple, such as checking the contention among operations. In addition, no special consideration is given as to the state of the load on the intelligent network system when carrying out an operation. Hence, when the load on the intelligent network system is large, the operator who operates the terminal restricted the operation by not executing the operation depending on the operator's judgement. However, it is difficult to rely on the operator to monitor the state of the load on the intelligent network system with respect to the operation which is periodically started, thereby causing the load on the intelligent network system to further increase even though the load is already large.

On the other hand, an Automatic Call Gapping (ACG) is prescribed by the ITU-T Recommendations as a mechanism for automatically reducing the load on the SCP in the intelligent network system. According to the ACG function, information such as gap duration and interval is transmitted to the SSP when the load on the SCP is excessively large, and the SSP restricts the'services depending on the received information and reduces service inquiries to the SCP, so that the load on the SCP is reduced.

Indeed, the load on the SCP changes proportionally to the amount of service inquiries from the SSP, and thus, the overload state of the SCP can be avoided by adjusting the amount of the service inquiries. However, in the intelligent network system which uses a general central processing unit (CPU) as the SCP, not only the amount of the service inquiries, but also maintenance operation application may cause the overload of the SCP. In this case, if the ACG function is activated as a means for reducing the load on the SCP, there is a problem in that the maintenance operation application will cause undesirable effects on the services.

SUMMARY OF THE INVENTION

Accordingly, it is a general object of the present invention to provide a novel and useful service management system and process control system for intelligent network system, in which the problems described above are eliminated.

Another and more specific object of the present invention is to provide a service management system and a process control system for an intelligent network system, in which a maintenance operation application is prevented from causing undesirable effects on services.

Still another object of the present invention is to provide a service management system adapted to an intelligent network system having a plurality of service switching points making service inquiries, and a plurality of service control points coupled to the service switching points and controlling services, comprising means, coupled to the plurality of service control points, for centrally managing databases of the service control points, and a process registration information table registering process information of a plurality of processes related to the service control points and the service management system, wherein the means uses the process registration information table to manage contention among the processes. According to the service management system of the present invention, it is possible to centrally manage the processes of the service control points and the service management system, and to easily manage the contention relationships of the processes.

A further object of the present invention is to provide a process control system for an intelligent network system which includes a plurality of service switching points making service inquiries, a plurality of service control points coupled to the service switching points and controlling services, and a service management system coupled to the plurality of service control points and centrally managing databases of the service control points, comprising a process registration information table, provided in the service management system, registering process information of a plurality of processes related to the service control points and the service management system, and the service management system uses the process registration information table to manage contention among the processes. According to the process control system of the present invention, it is possible to centrally manage the processes of the service control points and the service management system, and to easily manage the contention relationships of the processes.

Other objects and further features of the present invention will be apparent from the following detailed description when read in conjunction with the accompanying drawings.

BRIEF DESCRIPTION OF THE DRAWINGS

FIG. 10 is a diagram showing process information;

FIG. 11 is a diagram showing service information;

FIG. 12 is a diagram showing host information;

FIG. 13 is a diagram showing contention information of processes;

FIG. 14 is a diagram showing the process information;

FIG. 15 is a diagram showing service internal number information;

FIG. 16 is a diagram showing host internal number information;

FIG. 17 is a diagram showing contention information of processes;

FIG. 18 is a diagram showing SCP state information;

FIG. 19 is a diagram showing SCP state conversion information;

FIG. 21 is a diagram showing a process registration request information table;

FIG. 22 is a diagram showing process registration request internal conversion information;

DESCRIPTION OF THE PREFERRED EMBODIMENTS

Figure 1:
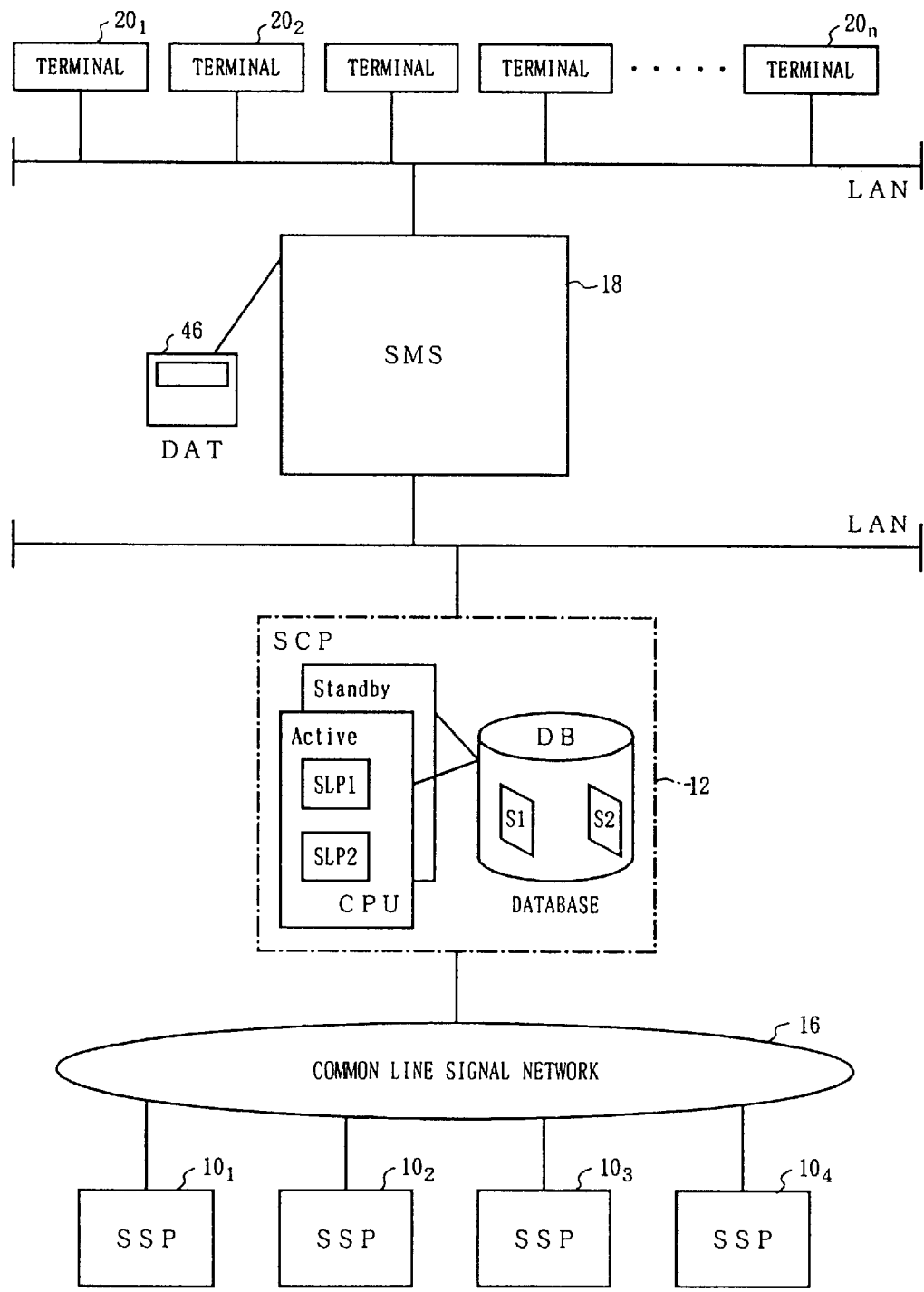
FIG. 1 is a system block diagram showing the system structure of a conventional intelligent network system.
Figure 2:
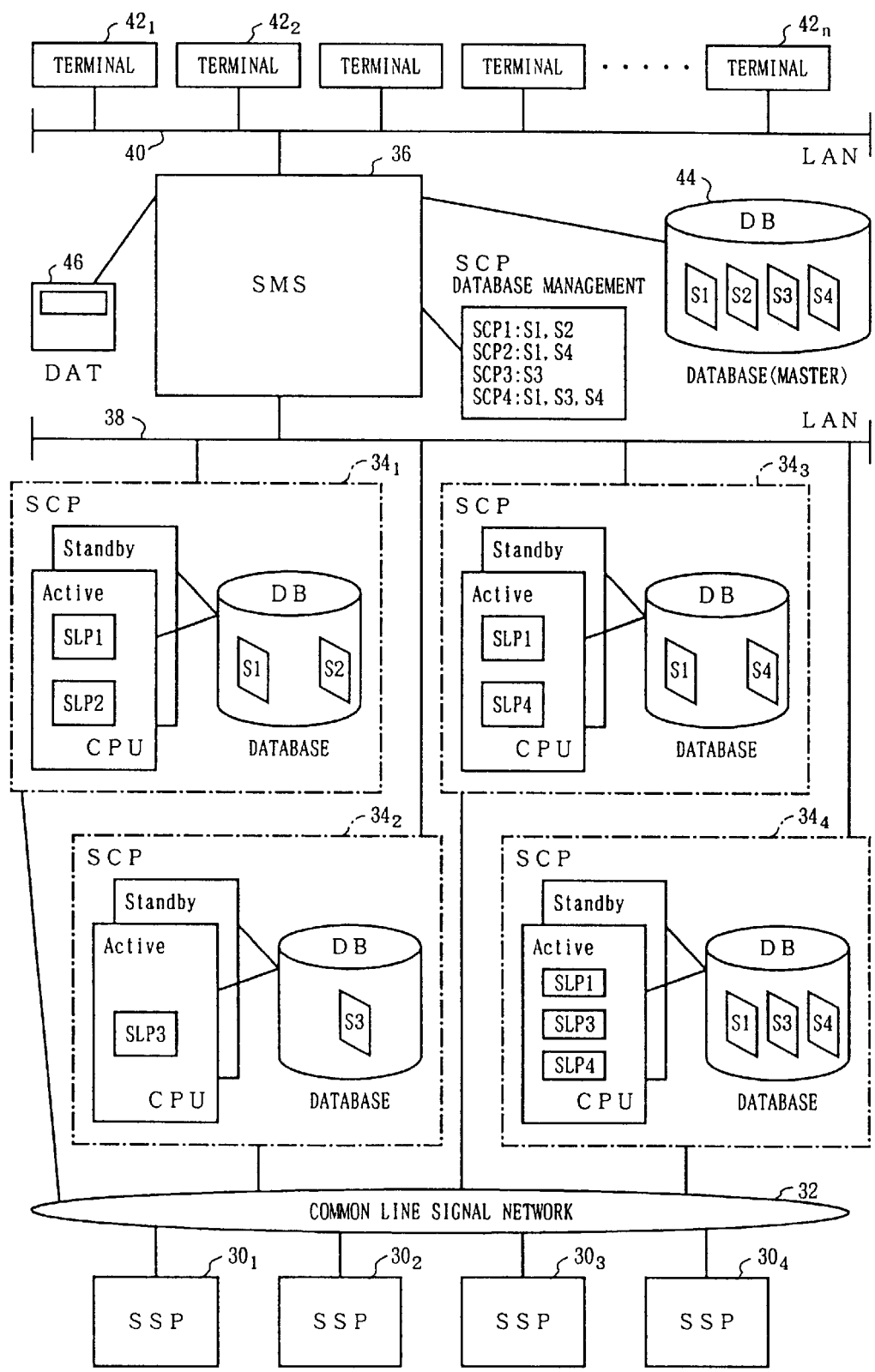
FIG. 2 is a system block diagram showing the system structure of an intelligent network system applied with an embodiment of a process control system according to the present invention.

FIG. 2 is a system block diagram showing the system structure of an intelligent network system applied with an embodiment of a process control system according to the present invention. In FIG. 2, a plurality of Service Switching Points (SSPs) $30_1$ through $30_4$ are telephone switching systems, for example, and make service inquiries with respect to service control points (SCPs) $34_1$ through $34_4$. These SSPs $30_1$ through $30_4$ are coupled to the plurality of SCPs $34_1$ through $34_4$ via a common signal network 32.

Each of the SCPs $34_1$ through $34_4$ has an active CPU, a standby CPU, and a database DB. For example, the CPU of the SCP $34_1$ executes a program SLP1 for providing a first service such as a number portability service, and a program SLP2 for providing a second service such as an account code service. Data S1 for the first service and data S2 for the second service are stored in the database DB of the SCP $34_1$. The CPU of the SCP $34_2$ executes a program SLP3 for providing a third service, and data S3 for the third service are stored in the database DB of the SCP $34_2$. The CPU of the SCP $34_3$ executes the program SLP1 for providing the first service and a program SLP4 for providing a fourth service, and the data S1 for the first service and data S4 for the fourth service are stored in the database DB of the SCP $34_3$. The CPU of the SCP $34_4$ executes the program SLP1 for providing the first service, the program SLP3 for providing the third service and the program SLP4 for providing the fourth service, and the data S1, S3 and S4 respectively for the first, third and fourth services are stored in the database DB of the SCP $34_4$. For example, the first service is provided by distributed processings of the SCPs $34_1$, $34_3$ and $34_4$.

A Service Management System (SMS) 36 is coupled to the SCPs $34_1$ through $34_4$ via a Local Area Network (LAN) 38, and is also coupled to terminals $42_1$ through $42_n$ via a LAN 40. The SMS 36 centrally manages the databases DB of the SCPs $34_1$ through $34_4$ by a database 44. Hence, master data of the data S1 through S4 stored in the databases DB of all of the SCPs $34_1$ through $34_4$ are stored in the database 44. The coherency of the data S1 in the databases DB of the SCPs $34_1$, $34_3$ and $34_4$, for example, is maintained by using the data S1 in the database 44 as a reference.

A Digital Audio Tape recorder (DAT) 46 of the SMS 36 is provided as a digital data storage device. Data used by processes $68_1$ through $68_n$ of the SMS 36 which will be described later are input to and output from the DAT 46. More particularly, the DAT 46 is used as an output device for backing up the database 44 of the SMS 36, an input device for restoring the database 44 of the SMS 36, output devices for backing up the SCPs $34_1$ through $34_4$ and the programs SLP1 through SLP4, input devices for restoring the SCPs $34_1$ through $34_4$ and the programs SLP1 through SLP4, and output devices for traffic data of the SCPs $34_1$ through $34_4$. These input and output devices are treated as processes in order to avoid simultaneous processes from the terminals $42_1$ through $42_n$, and are subject to the contention control.

Figure 3:
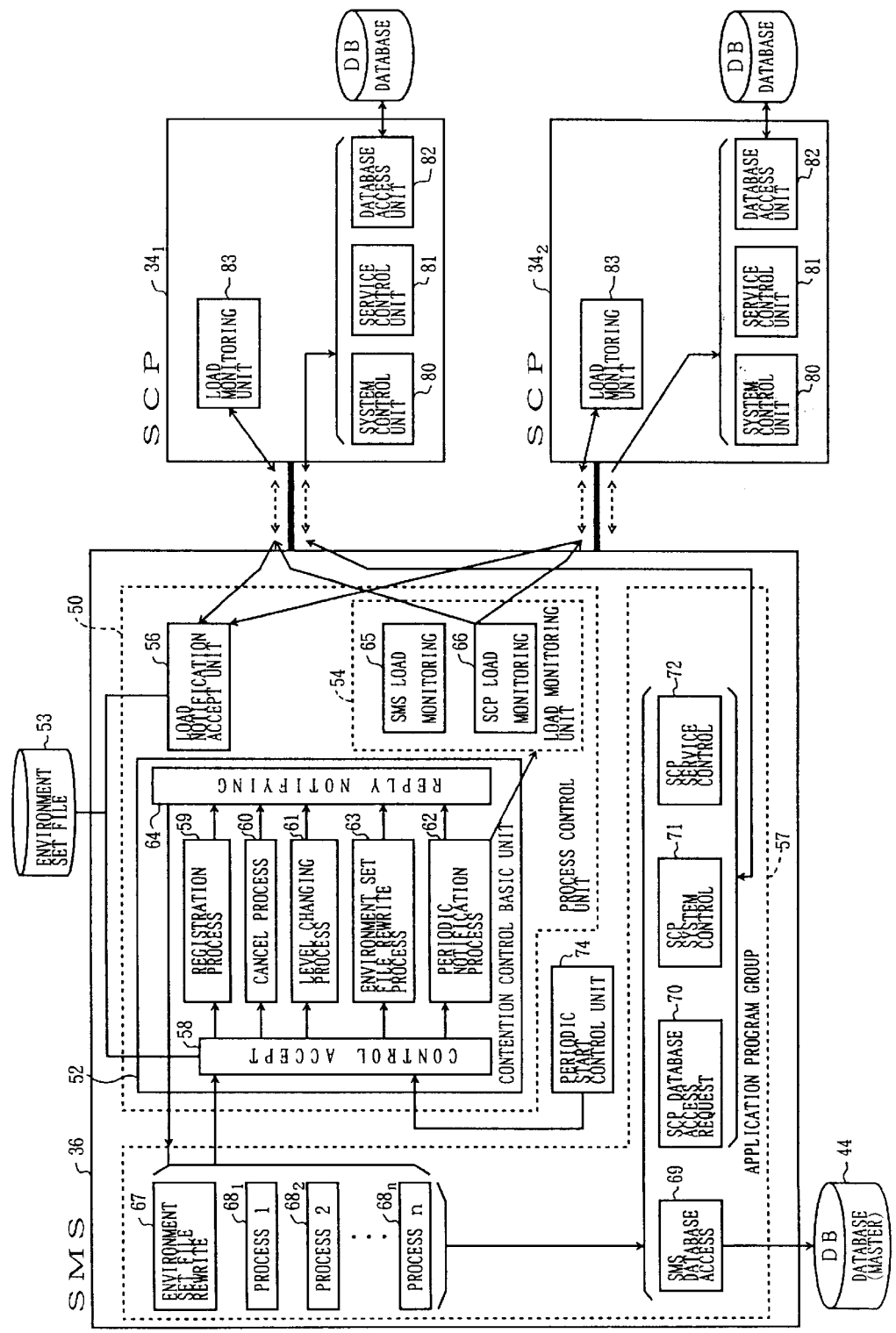
FIG. 3 is a functional block diagram for explaining the operations of a SMS and SCPs shown in FIG. 2.

Of course, the databases DB of the SCPs $34_1$ through $34_4$ may be provided within the SCPs $34_1$ through $34_4$ as shown in FIG. 2 or, may be provided externally to the SCPs $34_1$ through $34_4$ as shown in FIG. 3 which will be described later. Similarly, the database 44 and the DAT 46 of the SMS 36 may be provided externally to the SMS 36 as shown in FIG. 2 or, may be provided within the SMS 36.

FIG. 3 is a functional block diagram for explaining the operations of the SMS 36 and the SCPs $34_1$ and $34_2$ shown in FIG. 2. In FIG. 3, a process control unit 50 forms the core of the SMS 36, and includes a contention control basic unit 52, a load monitoring unit 54 and a load notification accept unit 56. A control accept part 58 of the contention control basic unit 52 accepts a request from each of the processes 681 through $68_n$ in an application program group 57. A registration process part 59 determines how to cope with a process depending on the load on the intelligent network system and the contention relationship with other processes, with respect to a process control registration from each process. A cancel process part 60 carries out a process control cancel process from each process. A level changing process part 61 carries out a process depending on a contention level. A periodic notification process part 62 determines how to cope with a process depending on the load on the intelligent network system, with respect to a periodic start from a periodic start control unit 74. An environment set file rewrite process part 63 carries out a rewrite process with respect to an environment set file. A reply notifying part 64 makes a reply notification.

A SMS load monitoring part 65 of a load monitoring unit 54 monitors a load on the SMS 36. A SCP load monitoring part 66 of the load monitoring unit 54 monitors loads on each of the SCPs $34_1$ through $34_4$. A load notification accept unit 56 accepts load change notifications from each of the SCPs $34_1$ through $34_4$ in order to immediately cope with a situation where the load on the SCP suddenly changes.

The application program group 57 includes various application programs which require process control using the process control unit 50. An environment set file rewrite part 67 within the application program group 57 makes an environment set file rewrite request. The processes $68_1$ through $68_n$ of the application program group 57 respectively are units subject to the process control. A SMS database access part 69 of the application program group 57 is started by the processes $68_1$ through $68_n$, and makes an access request to the database 44 of the SMS 36. A SCP database access request part 70 of the application program group 57 is started by the processes $68_1$ through $68_n$, and makes an access request to the databases DB of the SCPs $34_1$ through $34_4$. A SCP system control part 71 of the application program group 57 is started by the processes $68_1$ through $68_n$, and makes a SCP system state control request to the SCPs $34_1$ through $34_4$. A SCP service control part 72 of the application program group 57 is started by the processes $68_1$ through $68_n$, and makes a SCP service state control request to the SCPs $34_1$ through $34_4$. In addition, the periodic start control unit 74 controls a periodic process.

The processes $68_1$ through $68_n$ may be operations from the terminals $42_1$ through $42_n$ on the databases DB of the SCP2 $34_1$ through $34_4$ or the database 44 of the SMS 36 with respect to the database as a whole, for each service or, in data record units of each service, a database management process of the SMS 36, a database rewrite process carried out when a call request is made from the SSPs $30_1$ through $30_4$, a system state management process or a service state management process of the SCPs $34_1$ through $34_4$, a process related to an access to the DAT 46, and the like.

A system control unit 80 controls the SCP system state of a corresponding one of the SCPs $34_1$ through $34_4$ to which the system control unit 80 belongs. A service control unit 81 controls the SCP service state of a corresponding one of the SCPs $34_1$ through $34_4$ to which the service control unit 81 belongs. A database access unit 82 makes an access to the database DB of a corresponding one of the SCPs $34_1$ through $34_4$ to which the database access unit 82 belongs. A load monitoring unit 83 monitors a SCP load of a corresponding one of the SCPs $34_1$ through $34_4$ to which the load monitoring unit 83 belongs.

Figure 4:
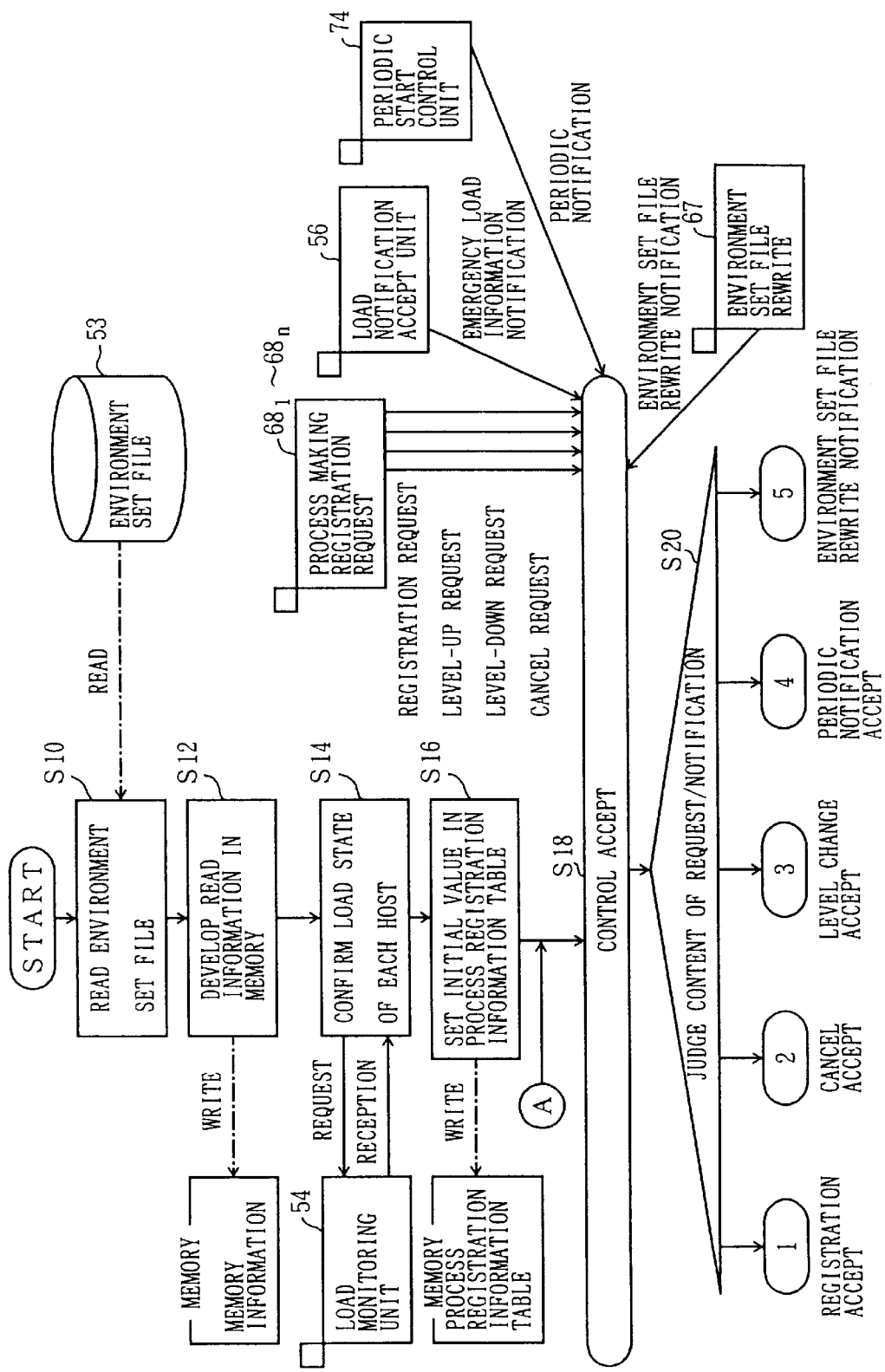
FIG. 4 is a flow chart for explaining a process of a contention control basic unit.

FIGS. 4 through 9 respectively are flow charts for explaining processes of the contention control basic unit 52. In FIG. 4, the contention control basic unit 52 reads an environment set file 53 in a step S10 simultaneously as when the intelligent network system is started. The environment set file 53 includes process information shown in FIG. 10, service information shown in FIG. 11, host information shown in FIG. 12, and contention level information of processes shown in FIG. 13.

The process information shown in FIG. 10 includes an information conversion table for each request process such as an editor and a database loading. In the case of the information conversion table for the case where the request process is the editor, a process in a first line and subject to the contention monitoring has a value "1" set at positions corresponding to the processes of (8) a database loading, (6) a restore and (1) an editor which check the control responsive to a request of the editor. This means that even if a request of the editor is made, the request of the editor may not be accepted if the editor, the restore (database restore) or the database loading is being executed. A process in a second line and subject to the service contention monitoring has a value "1" set at a position corresponding to the process which checks the service responsive to a request of the editor. A process in a third line and subject to the host contention monitoring has a value "1" set at a position corresponding to the process which checks the host (SCPs $34_1$ through $34_4$ and SMS 36) responsive to a request of the editor. Similarly, a process in a fourth line and subject to the data record contention monitoring has a value "1" set at a position corresponding to the process which checks the data record responsive to a request, a process in a fifth line and subject to the process level contention has a value "1" set at a position corresponding to the process which checks the process level responsive to a request, and a forcibly endable level (level at which a forced end is possible) in a sixth line has a level written therein if a request has the authority to make a forced end.

The service information shown in FIG. 11 is 15 set with conversion values of each of the services when storing the services such as Group, NPS, ABS and ACS with respect to a contention registration request.

In addition, the host information shown in FIG. 12 is set with conversion values of each of the hosts when storing the hosts such as Group, SCPs $34_1$ through $34_4$ (SCP-1, etc.), the SMS 36 (m-sms) and the DAT 46 (DAT-1, etc.).

According to the contention retrieval method employed in this intelligent network system, a judgement is made based on a logical product. For this reason, when a plurality of services or hosts are the subject of the contention when registering the processes $68_1$ through $68_n$, the contention control can be made in one registration by specifying the Group. For example, in a case where three services ABS, NPS and ACS exist in the SMS 36 and the database backup functions backs up the services ABS and ACS, the database backup makes a registration request by specifying the Group-2 shown in FIG. 11. In this case, if the process subject to the contention is operating, a value other than "0" is returned by the service judgement and the registration becomes impossible.

The contention level information of the process shown in FIG. 13 is set with the levels corresponding to the rates of use of each of the CPUs of the SCPs $34_1$ through $34_4$ and the SMS 36, and the levels corresponding to processes of an editor registration request, an editor level-up request, a data base loading and the like.

Returning now to the description of FIG. 4, a step S12 develops each information read from the environment set file 53 in an internal memory of the contention control basic unit 52. FIG. 14 shows the process information developed in the internal memory of the contention control basic unit 52, and a process internal number corresponding to a process name is added. FIG. 15 shows service internal number information which corresponds to the service information and is developed in the internal memory. FIG. 16 shows host internal number information which corresponds to the host information and is developed in the internal memory. FIG. 17 shows contention level information of process developed in the internal memory. In FIG. 15, "All Service" indicates all of the services such as the ABS, NPS and ACS, and in FIG. 16, "All Host" indicates all of the hosts.

Next, a step S14 obtains load states of the SCPs $34_1$ through $34_4$ and the SMS 36 from the load monitoring unit 54. FIG. 18 shows SCP state information obtained in this case. This SCP state information includes a process name of SCP-1, a service name of NPS, a host name of scp-1, a data record that is NULL, a CPU utilization rate that is 30%, a process ID that is NULL, and address information that is NULL. Then, a step S16 converts the process name, the service name and the host name of the SCP state information into the process internal number, the service internal number and the host internal number using the process information, the service internal number information and the host internal number information respectively shown in FIGS. 14, 15 and 16.

In addition, the CPU utilization rate is compared with the contention information of the processes shown in FIG. 17 and is converted into an internal number of the contention level so as to obtain SCP state conversion information shown in FIG. 19. Thereafter, the SCP state conversion information is set as an initial value in a process registration information table shown in FIG. 20. In this process registration information table, address information of the processes and the next address are set in advance. Further, temporary stop information indicates whether or not the process is in a temporary stop state.

A step S18 waits for a registration request, a cancel request, a level change request, a periodic notification, an environment set file rewrite notification and a load notification of each of the processes to be supplied to the control accept part 58. When the above described request or notification is supplied to the control accept part 58, a step S20 judges the content of the request or notification, and the process advances to one of the processes shown in FIGS. 5 through 9 depending on a judgement result in the step S20.

Figure 5:
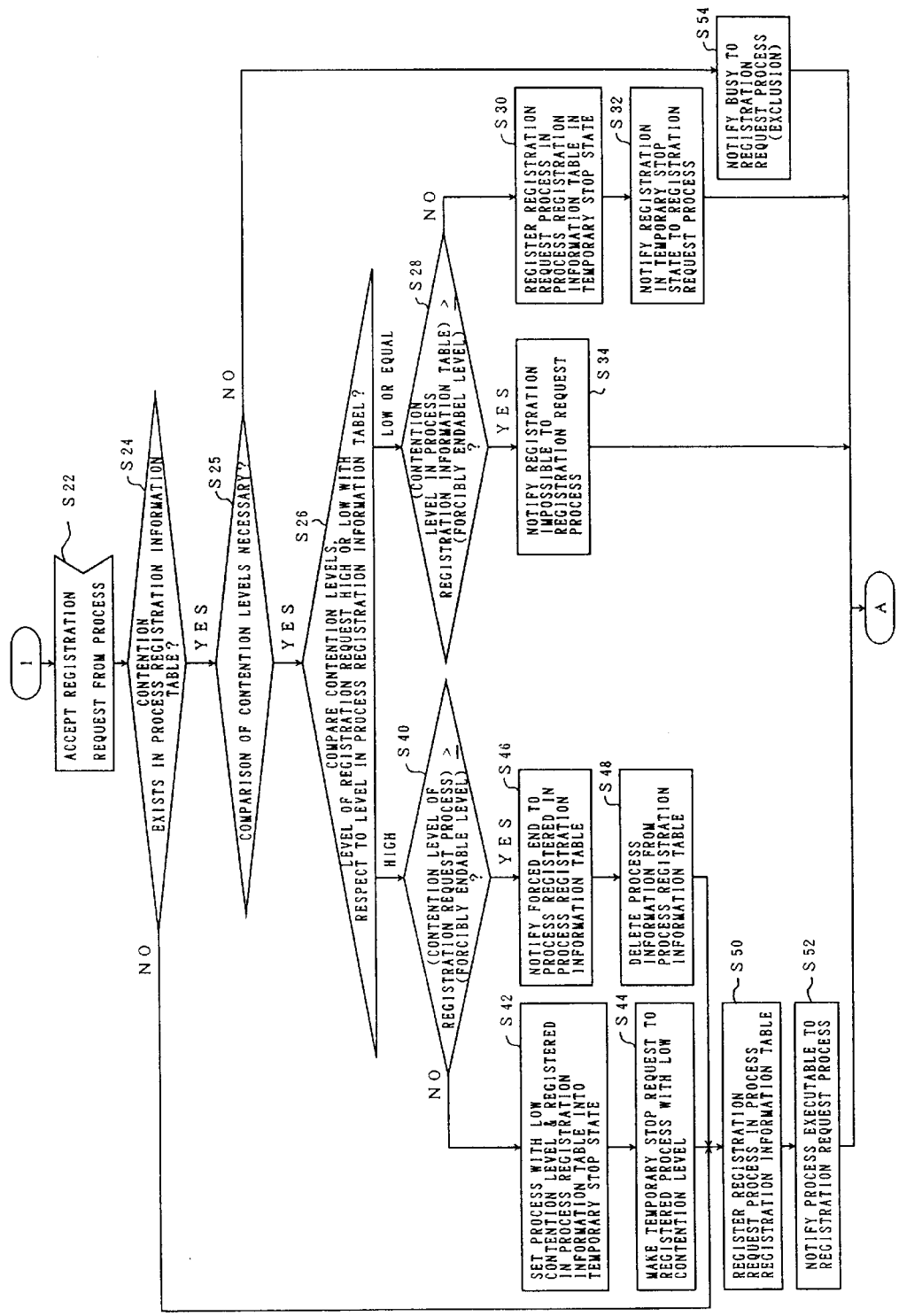
FIG. 5 is a flow chart for explaining a process of the contention control basic unit.

If the judgement result in the step S20 indicates the registration request of the process, the process advances to the process shown in FIG. 5, and a step S22 accepts and converts process registration request information. FIG. 21 shows a process registration request which is accepted in this case. This process registration request includes a process name of Editor, a service name of NPS, a host name of m-sms, a data record that is NPS00011, a CPU utilization rate that is 30%, a process ID that is 123456, and address information that is wwwqwwgg. The process name, the service name and the host name are converted into a process internal number, a service internal number and a host internal number using the process information, the service internal number information and the host internal number information respectively shown in FIGS. 14, 15 and 16.

Moreover, the CPU utilization rate is compared with the contention information of the processes shown in FIG. 17 and is converted into an internal number of the contention level so as to obtain process registration request internal conversion information shown in FIG. 22.

Next, a step S24 retrieves the process information shown in FIG. 14 using the process internal number shown in FIG. 22 of the concerned process for which the registration request is obtained, and a process subject to the contention monitoring of the concerned process. In addition, the step S24 compares the process subject to the contention monitoring with the process internal numbers of each of the data blocks in the process registration information table shown in FIG. 20, so as to judge whether or not a contention exists. First, a logical product of the internal process number of the process subject to the contention monitoring and each of the process internal numbers is obtained, and it is judged that there is no contention if the logical product is "0" and that a contention exists if the logical product is other than "0". The service information is not judged if the above logical product is "0", and the service information is judged if the above logical product is other than "0". If the service information is not judged, the process advances to a step S25 which will be described later.

Figure 20:
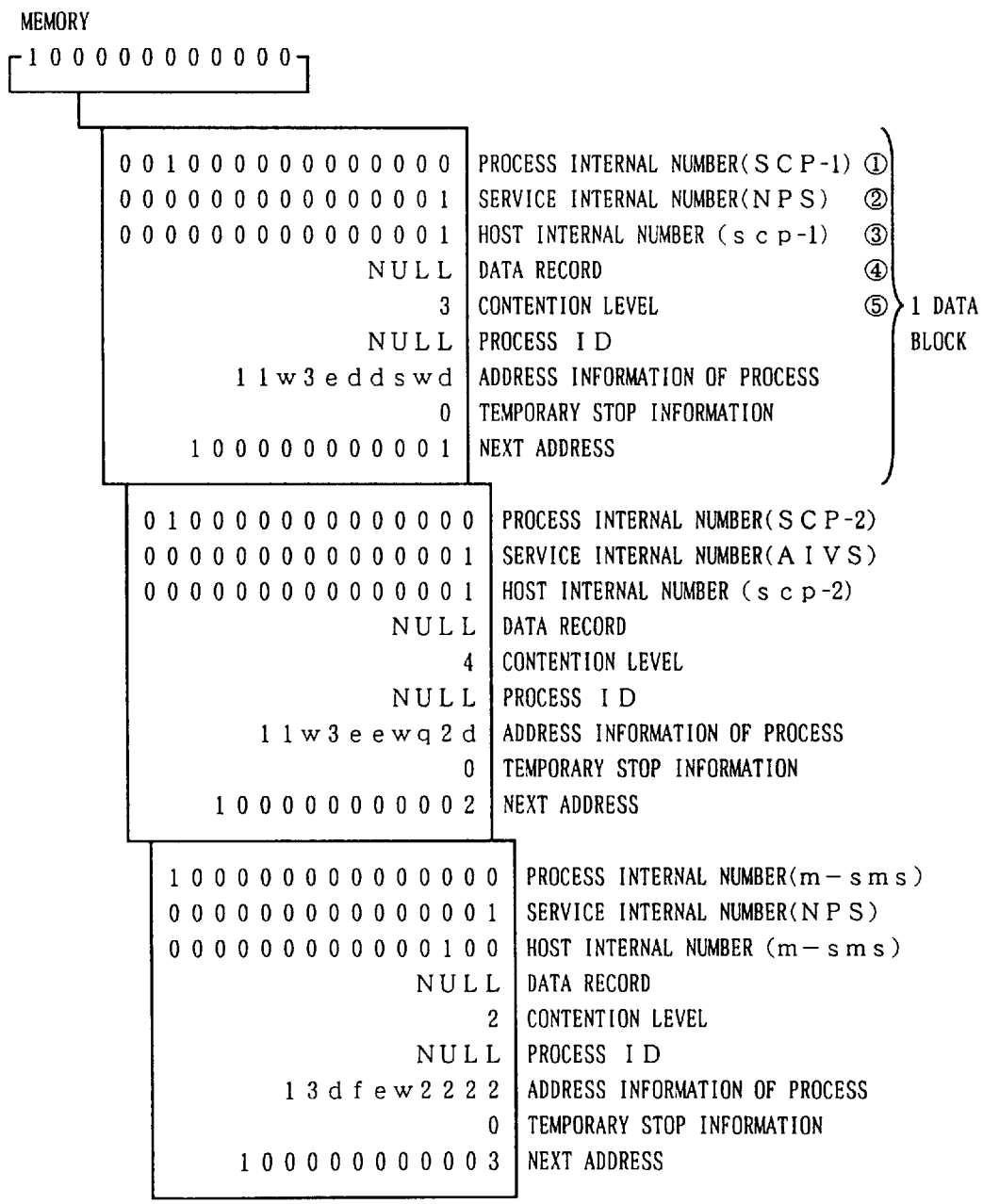
FIG. 20 is a diagram showing a process registration information table.

When the service information needs to be judged, a logical product of the service internal number of the registration request shown in FIG. 22 and the service internal number of the concerned data block of the process registration information table shown in FIG. 20 is obtained, so as to judge whether or not the service information indicates a service subject to the contention monitoring. If this logical product of the service internal numbers is other than "0", a logical product of the process number of the process subject to the host contention monitoring and the process internal number of the concerned data block is obtained, and the host information is not judged if this logical product is "0", and the host information is judged if this logical product is other than "0".

When the host information needs to be judged, a logical product of the host internal number of the registration request shown in FIG. 22 and the host internal number of the concerned data block of the process registration information table shown in FIG. 20 is obtained, so as to judge whether or not the host information indicates a host subject to the contention monitoring. If this logical product of the host internal numbers is other than "0", a logical product of the process internal number of the process subject to the data record contention monitoring and the process internal number of the concerned data block is obtained, and the data record is not judged if this logical product is "0", and the data record is judged if this logical product is other than "0".

When the data record needs to be judged, a logical product of the data record of the registration request shown in FIG. 22 and the data record of the concerned data block in the process registration information table shown in FIG. 20 is obtained, so as to judge whether or not a contention of the data records exists. If this logical product of the data records is other than "0", a step S25 obtains a logical product of the process internal number of the process subject to the process level contention monitoring and the process internal number of the concerned data block, and the process level is not judged if this logical product is "0", and the process level is judged if this logical product is other than "0". If the logical product of the process internal numbers is "0" and the judgement result in the step S25 is NO, an exclusive relationship exists between the processes, and a step S54 notifies the registration request process of the exclusive relationship by notifying that the process is in use.

If a result of the above described judgement indicates that the process level needs to be checked and the judgement result in the step S25 is YES, a step S26 compares the contention levels. If the contention level of the registration request shown in FIG. 22 is lower than or equal to the contention level of the concerned data block in the process registration information table shown in FIG. 20, a step S28 judges whether or not the contention level of the process registration information table is greater than or equal to the forcibly endable level shown in FIG. 14 of the registration request process. If the judgement result in the step S28 is NO, a step S30 registers the temporary stop state to the process registration information table, and a step S32 notifies the temporary stop to the registration request process. On the other hand, if the judgement result in the step S28 is YES, a step S34 notifies the registration request process that the registration is impossible.

If the contention level of the registration request is higher than the contention level of the concerned data block in the process registration information table in the step S26, a step S40 judges whether or not the contention level of the registration request shown in FIG. 22 is greater than or equal to the forcibly endable level shown in FIG. 14. If the judgement result in the step S40 is NO, a step S42 sets the process having the low contention level and registered in the process registration information table shown in FIG. 20 into the temporary stop state, and a step S44 makes a temporary stop request to the process having the low contention level. On the other hand, if the judgement result in the step S40 is YES, a step S46 notifies a forced end to the process registered in the process registration information table, and a step S48 deletes corresponding information (data block) from the process registration information table. After the step S44 or S48, a step S50 registers the registration request process shown in FIG. 22 in the process registration information table shown in FIG. 20, and a step S52 notifies this registration request process that the process is executable.

Also, the process advances to the above step S50 also if the judgement result in the step S24 is NO. The process returns to the step S18 shown in FIG. 4 when the above described steps end.

Figure 23:
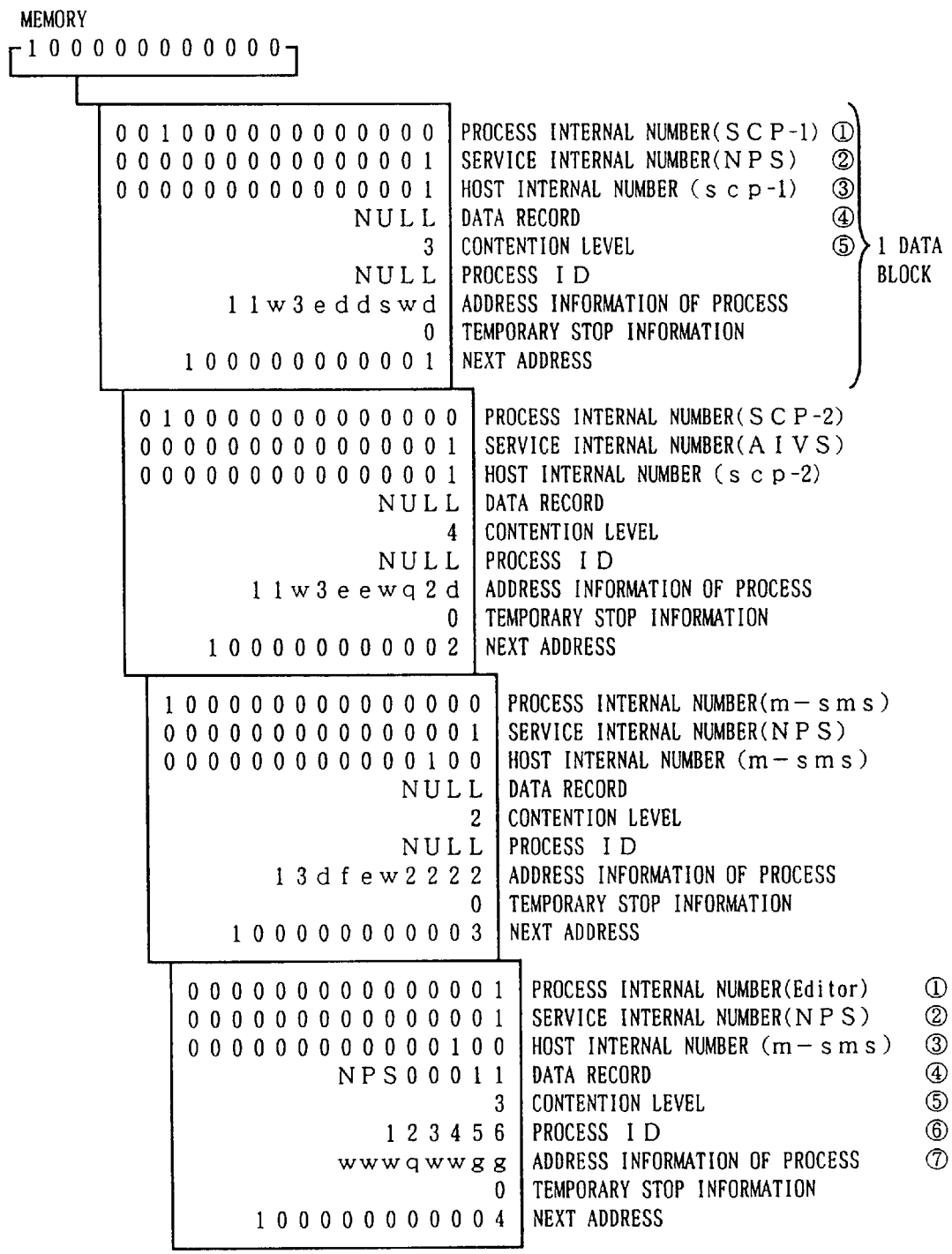
FIG. 23 is a diagram showing a process registration information table.

FIG. 23 shows a process registration information table for a case where the registration request process shown in FIG. 22 with respect to the process registration information table shown in FIG. 20 exists and the registration is successful. FIG. 23 shows a case where an editor which operates in the SMS 36 is newly registered but is in the temporary stop state if the temporary stop information is "1".

Figure 6:
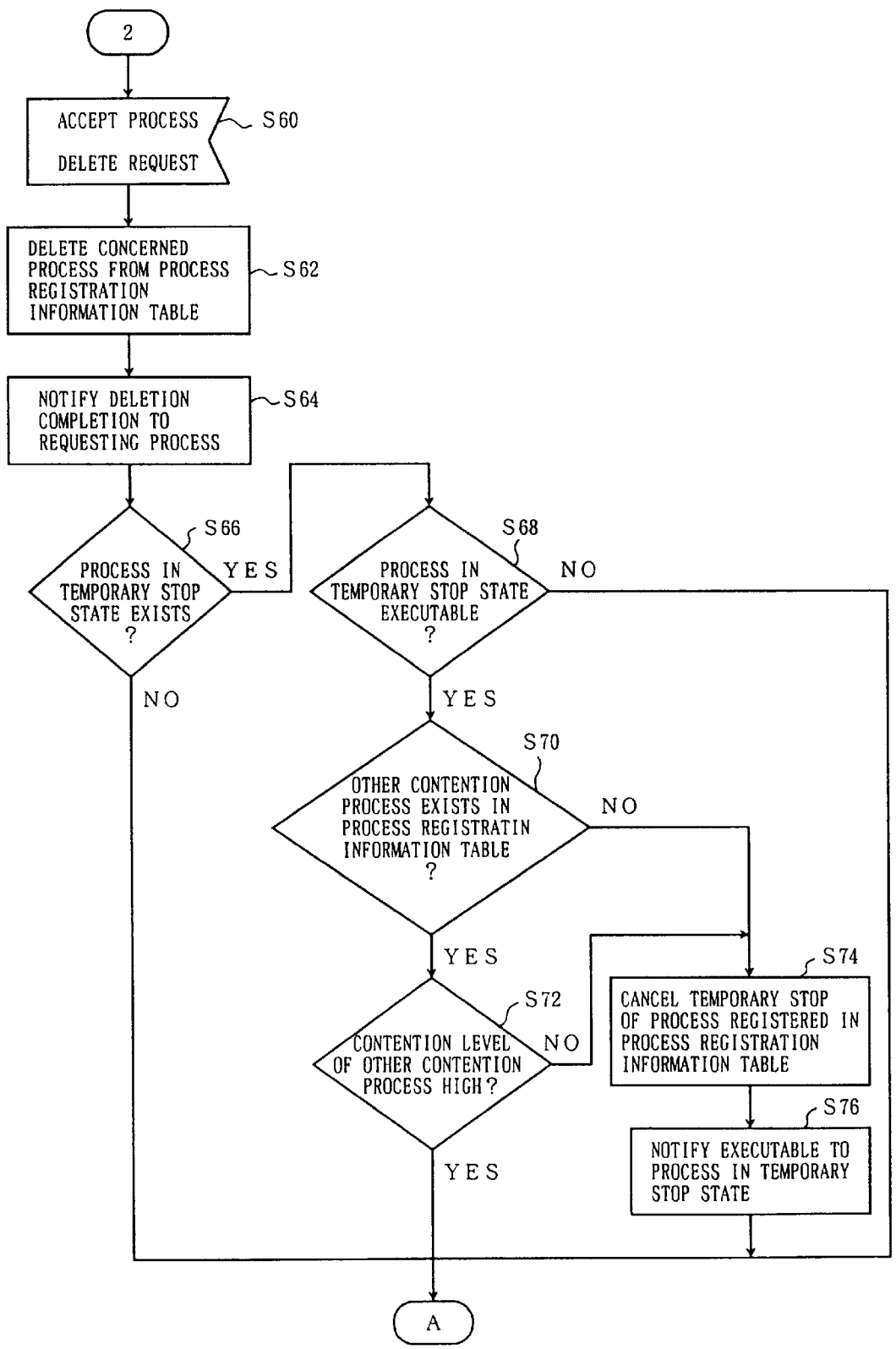
FIG. 6 is a flow chart for explaining a process of the contention control basic unit.

If the judgement result in the step S20 shown in FIG. 4 indicates a delete request of the process, the process advances to the process shown in FIG. 6, and a step S60 accepts process delete request information. A step S62 deletes the concerned process from the process registration information table, and a step S64 notifies the completion of the deletion of the requested process. Next, a step S66 judges from the process registration information table whether or not a process in the temporary stop state exists. If the judgement result in the step S66 is YES, a step S68 checks whether or not the process in the temporary stop state is executable. If the judgement result in the step S68 is YES, a step S70 judges whether or not another contention process exists in the process registration information table. If the judgement result in the step S70 is YES, a step S72 judges whether or not the contention level of the other contention process is high. In other words, if the judgement result in the step S66 is YES, the steps S68 through S72 carry out checking operations similarly to the steps S24, S25, S26 and S28. If the judgement result in the step S70 or S72 is NO, a step S74 cancels the temporary stop of the process registered in the process registration information table. In addition, a step S76 notifies the process which is temporarily stopped that the process is executable.

After the above described steps end, the process returns to the step S18 shown in FIG. 4. The process shown in FIG. 6 ends if the judgement result in the step S66 or S68 is NO, the judgement result in the step S72 is YES or, after the step S76.

Figure 7:
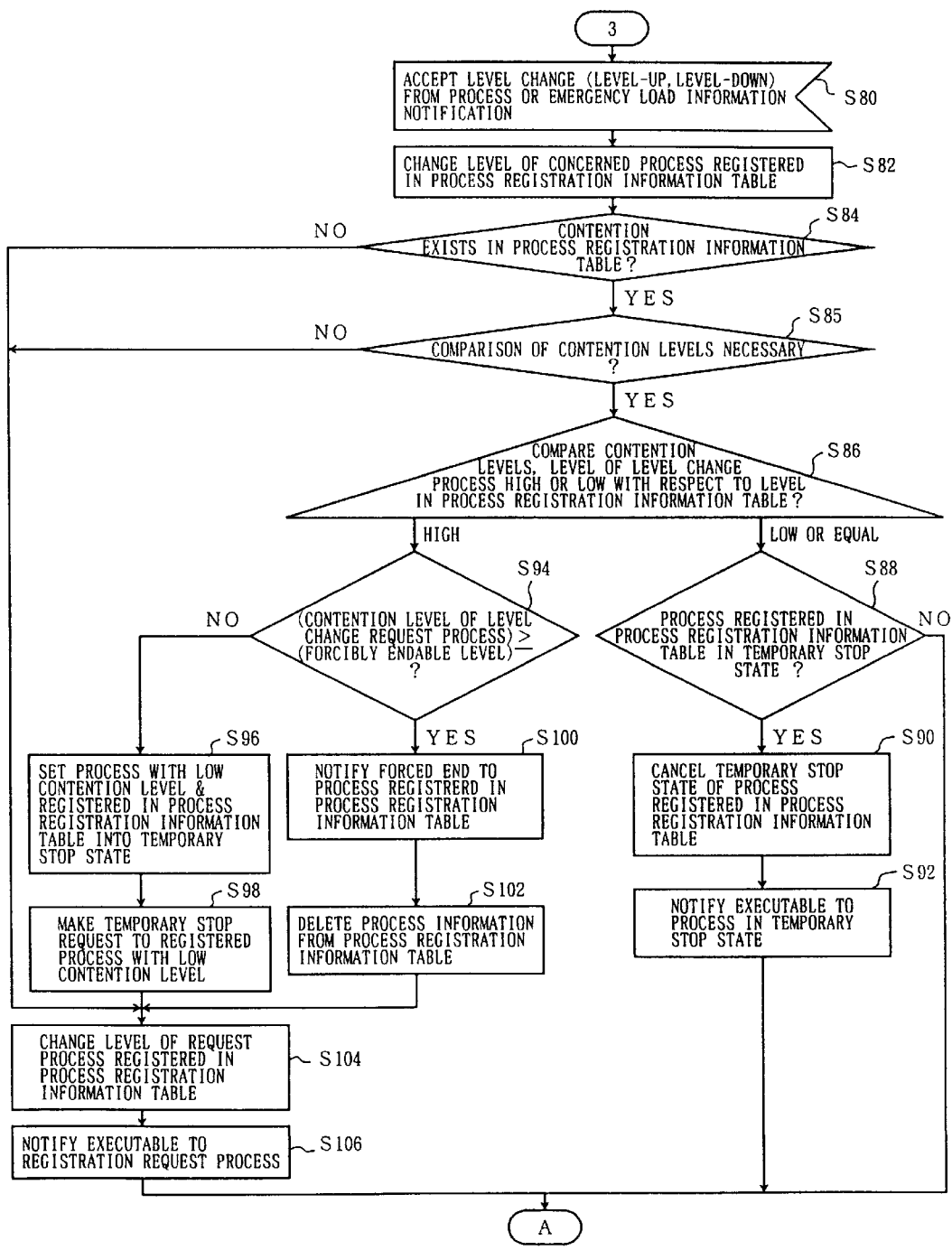
FIG. 7 is a flow chart for explaining a process of the contention control basic unit.

If the judgement result in the step S20 shown in FIG. 4 indicates a level change request of the process or a notification from the load notification accept unit 56, the process advances to the process shown in FIG. 7, and a step S80 accepts the level change request or the notification. A step S82 changes the level of the concerned process registered in the process registration information table. In the case of the notification from the load notification accept unit 56, the notified CPU utilization rate is used to read the internal number of a corresponding contention level from FIG. 17, and the contention level of the corresponding process registered in the process registration information table is changed.

Next, a step S84 retrieves the process information shown in FIG. 13 using the process internal number of the process having the changed level, so as to obtain the process subject to the contention monitoring of the concerned process, and a judgement is made as to whether or not a contention exists by comparing the obtained process subject to the contention and the process internal number of each data block in the process registration information table shown in FIG. 20. First, a logical product of the process internal number of the process subject to the contention monitoring and each process internal number is obtained, and it is judged that no contention exists if the logical product is "0" and that the contention exists if the logical product is other than "0". In addition, a logical product of the process internal number of the process subject to the service contention monitoring and the process internal number of the concerned data block is obtained, and it is judged that the service information is not judged if the logical product is "0" and that the service information is judged if the logical product is other than "0". The process advances to a step S104 if it is judged that the service information is not judged.

When the service information needs to be judged, a logical product of the service internal number of the registration request shown in FIG. 22 and the service internal number of the concerned data block in the process registration information table shown in FIG. 20 is obtained, so as to judge whether or not the service is a service subject to the contention monitoring. If the logical product of the service internal numbers is other than "0", a logical product of the process internal number of the process subject to the host contention monitoring and the process internal number of the concerned data block is obtained, and the host information is not judged if his logical product is "0" and the host information is judged if this logical product is other than "0".

When the host information needs to be judged, a logical product of the host internal number of the registration request shown in FIG. 22 and the host internal number of the concerned data block in the process registration information table shown in FIG. 20 is obtained, so as to judge whether or not the host is a host subject to the contention monitoring. If the logical product of the host internal numbers is other than "0", a logical product of the process internal number of the process subject to the data record contention monitoring and the process internal number of the concerned data block is obtained, and the data record is not judged if this logical product is "0" and the data record is judged if this logical product is other than "0".

When the data record needs to be judged, a logical product of the data record of the registration request shown in FIG. 22 and the data record of the concerned data block in the process registration information table shown in FIG. 20 is obtained, so as to judge whether or not a contention of the data records exists. If the logical product of the data records is other than "0", a step S85 obtains a logical product of the process internal number of the process subject to the process level contention monitoring and the process internal number of the concerned data block, and it is judged that no process level judgement is needed if this logical product is "0" and that the process level judgement is needed if this logical product is other than "0".

If the process level needs to be checked as a result of the above described judgement, a step S86 compares the contention levels. If the contention level of the level change process is lower than or equal to the contention level of the concerned data block of the process registration information table shown in FIG. 20, a step S88 judges whether or not the process registered in the process registration information table is in the temporary stop state. If the judgement result in the step S88 is YES, a step S90 cancels the temporary stop of the process registered in the process registration information table, and a step S92 notifies the process in the temporary stop state that the process is executable.

On the other hand, if the contention level of the level change process is higher than the contention level of the process registration information table in the step S86, a step S94 judges whether or not the contention level of the level change process is higher than or equal to the forcibly endable level shown in FIG. 14. If the judgement result in the step S94 is NO, a step S96 sets the process having the low contention level and registered in the process registration information table shown in FIG. 20 to the temporary stop state, and a step S98 makes a temporary stop request to the above process having the low contention level. If the judgement result in the step S94 is YES, a step S100 notifies a forced end to the process registered in the process registration information table, and a step S102 deletes the corresponding information (data block) from the process registration information table. After the step S98 or S102, the process advances to a step S104. The step S104 changes the level of the request process registered in the process registration information table, and notifies this registered request process that the process is executable. The process advances to the step S104 also when no contention exists and the judgement result in the step S84 is NO. After the step S92 or S106 or, if the judgement result in the step S88 is NO, the process returns to the step S18 shown in FIG. 4.

Figure 8:
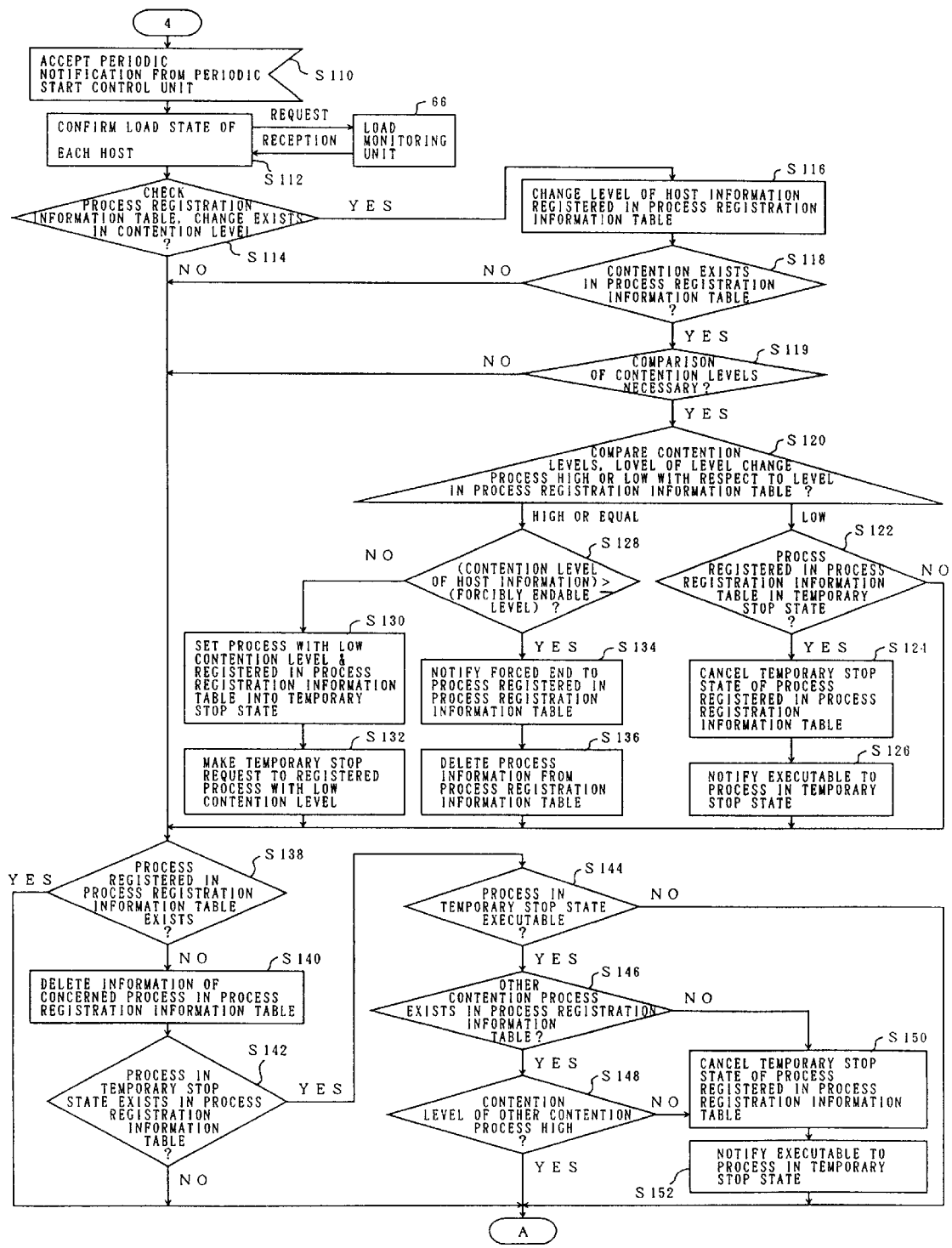
FIG. 8 is a flow chart for explaining a process of the contention control basic unit.

When the periodic notification is received from the periodic start control unit 74, a step S110 shown in FIG. 8 accepts this periodic notification, and a step S112 obtains the load states of the SCPs $34_1$ through $34_4$ and the SMS 36 from the load monitoring unit 54. A step S114 checks the process registration information table and judges whether or not a change exists in the contention level. If the judgement result in the step S115 is YES, a step S116 changes the contention level of the process registration information table.

Next, a step S118 retrieves the process information shown in FIG. 14 by the process internal number of the process having the changed level, so as to obtain a process subject to the contention monitoring of the concerned process. In addition, the step S118 compares the process internal number of the obtained process subject to the contention monitoring and the process internal number of each data block in the process registration information table shown in FIG. 20, so as to judge whether or not a contention exists. First, a logical product of the process internal number of the process subject to the contention monitoring and each process internal number in the process registration information table is obtained, and it is judged that no contention exists if the logical product is "0" and that a contention exists if the logical product is other than "0". In addition, the service information is not judged if the logical product of the process internal number of the process subject to the service contention monitoring and the process internal number of the concerned data block is "0", and the service information is judged if this logical product is other than "0". When the service information is not judged, the process advances to a step S138 which will be described later.

When the service information needs to be judged, a logical product of the service internal number of the registration request shown in FIG. 22 and the service internal number of the concerned data block in the process registration information table shown in FIG. 20 is obtained, so as to judge whether or not the service is a service subject to the host contention monitoring. If the logical product of the service internal numbers is other than "0", a logical product of the process internal number of the process subject to the host contention monitoring and the process internal number of the concerned data block is obtained, and the host information is not judged if this logical product is "0" and the host information is judged if this logical product is other than "0".

When the host information needs to be judged, a logical product of the host internal number of the registration request shown in FIG. 22 and the host internal number of the concerned data block in the process registration information table shown in FIG. 20 is obtained, so as to judge whether or not the host is a host subject to the contention monitoring. If the logical product of the host internal numbers is other than "0", a logical product of the process internal number of the process subject to the data record contention monitoring and the process internal number of the concerned data block is obtained, and the data record is not judged if this logical product is "0" and the data record is judged if this logical product is other than "0".

When the data record needs to be judged, a logical product of the data record of the registration request shown in FIG. 22 and the data record of the concerned data block in the process registration information table shown in FIG. 20 is obtained, so as to judge whether or not a contention of the data records exists. If the logical product of the data records is other than "0", a step S119 obtains a logical product of the process internal number of the process subject to the process level contention monitoring and the process internal number of the concerned data block is obtained, and the process level is not judged if this logical product is "0" and the process level is judged if this logical product is other than "0".

If the process level needs to be checked as a result of the above described judgement, a step S120 compares the contention levels. If the contention level of the level change process is lower than or equal to the contention level of the concerned data block of the process registration information table shown in FIG. 20, a step S122 judges whether or not the process registered in the process registration information table is in the temporary stop state. If the judgement result in the step S122 is YES, a step S124 cancels the temporary stop of the process registered in the process registration information table, and a step S126 notifies the process in the temporary stop state that the process is executable.

On the other hand, if the contention level of the level change process is higher than the contention level of the process registration information table in the step S120, a step S128 judges whether or not the contention level of the level change process is higher than or equal to the forcibly endable level shown in FIG. 14. If the judgement result in the step S128 is NO, a step S130 sets the process having the low contention level and registered in the process registration information table shown in FIG. 20 to the temporary stop state, and a step S132 makes a temporary stop request to the above process having the low contention level. If the judgement result in the step S128 is YES, a step S134 notifies a forced end to the process registered in the process registration information table, and a step S136 deletes the corresponding information (data block) from the process registration information table. After the step S126, S132 or S136, the process advances to the step S138. The step S138 judges whether or not a process registered in the process registration information table exists. If the judgement result in the step S138 is NO, a step S140 deletes the corresponding process from the process registration information table.

Next, a step S142 judges whether or not a process in the temporary stop state exists in the process registration information table. If the judgement result in the step S142 is YES, steps S144 through S148 carry out processes similarly to the steps S24, S25, S26 and S28 shown in FIG. 5 described above. More particularly, the step S144 judges whether or not the process in the temporary stop state is executable. If the judgement result in the step S144 is YES, the step S146 judges whether or not a contention exists with another process in the process registration information table. If the judgement result in the step S146 is YES, the step S148 judges whether or not the contention level of the other process is high.

If there is no more process which makes the contention or the contention level of the process becomes low as a result of the above described checking made by the steps S144 through S148, the judgement result in the step S146 or S148 becomes NO, and the process advances to a step S150. The step S150 cancels the temporary stop of the process registered in the process registration information table, and a step S152 notifies the process which is in the temporary stop state that the process is executable. After the step S152 or, if the judgement result in the step S138 or S148 is YES or, if the judgement result in the step S142 or S144 is NO, the process returns to the step S18 shown in FIG. 4.

Figure 9:
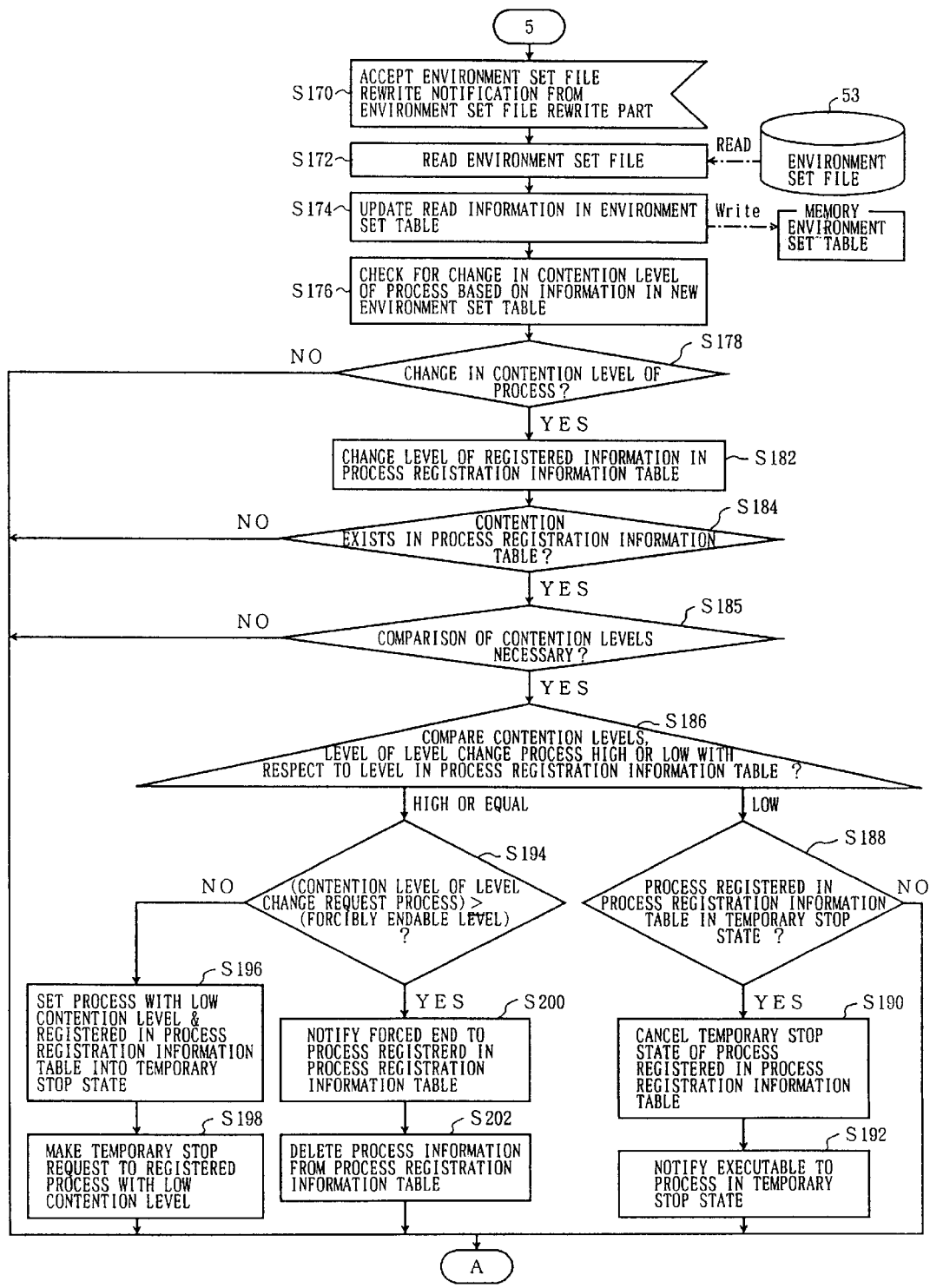
FIG. 9 is a flow chart for explaining a process of the contention control basic unit.

When the contention control basic unit 52 receives an environment set file rewrite notification from the environment set file rewrite part 67, a step S170 shown in FIG. 9 accepts this environment set file rewrite notification, and a step S172 reads the environment set file 53 and develops the environment set file in the internal memory of the contention control basic unit 52. Then, a step S174 updates the information shown in FIGS. 14 through 17 by the information of the environment set file rewrite notification. A step S176 checks the contention level of the process based on the updated information shown in FIGS. 14 through 17. Next, a step S178 judges whether or not there is a change in the contention level of the process from the check result of the step S176, and if the judgement result in the step S178 is YES, a step S182 changes the contention level of the process registered in the process registration information table.

A step S184 retrieves the process information shown in FIG. 14 by the process internal number of the process having the changed level, so as to obtain a process subject to the contention monitoring of the concerned process. In addition, the step S184 compares the process internal number of the process subject to the contention monitoring and the process internal number of each data block in the process registration information table shown in FIG. 20, so as to judge whether or not a contention exists. First, a logical product of the process internal number of the process subject to the contention monitoring and each process internal number in the process registration information table is obtained, and it is judged that no contention exists if the logical product is "0" and that the contention exists if the logical product is other than "0". A logical product of the process internal number of the process subject to the service contention monitoring and the process internal number of the concerned data block is obtained, and the service information is not judged if this logical product is "0", and the service information is judged if this logical product is other than "0". If the service information is not judged, the process returns to the step S18 shown in FIG. 5.

When the service information needs to be judged, a logical product of the service internal number of the registration request shown in FIG. 22 and the service internal number of the concerned data block in the process registration information table shown in FIG. 20 is obtained, so as to judge whether or not the service is a service subject to the contention monitoring. If the logical product of the service internal numbers is other than "0", a logical product of the process internal number of the process subject to the host contention monitoring and the process internal number of the concerned data block is obtained, and the host information is not judged if this logical product is "0" and the host information is judged if this logical product is other than "0".

When the host information needs to be judged, a logical product of the host internal number of the registration request shown in FIG. 22 and the host internal number of the concerned data block in the process registration information table shown in FIG. 29 is obtained, so as to judge whether or not the host is a host subject to the contention monitoring. If the logical product of the host internal numbers is other than "0", a logical product of the process internal number of the process subject to the data record contention monitoring and the process internal number of the concerned data block is obtained, and the data record is not judged if this logical product is "0" and the data record is judged if this logical product is other than "0".

When the data record needs to be judged, a logical product of the data record of the registration request shown in FIG. 22 and the data record of the concerned data block in the process registration information table shown in FIG. 20 is obtained, so as to judge whether or not a contention of the data records exists. If the logical product of the data records is other than "0", a step S185 obtains a logical product of the process internal number of the process subject to the process level contention monitoring and the process internal number of the concerned data block, and the process level is not judged if this logical product is "0" and the process level is judged if this logical product is other than "0".

If the process level needs to be checked as a result of the above described judgement, a step S186 compares the contention levels. If the contention level of the level change process is lower than or equal to the contention level of the concerned data block of the process registration information table shown in FIG. 20, a step S188 judges whether or not the process registered in the process registration information table is in the temporary stop state. If the judgement result in the step S188 is YES, a step S190 cancels the temporary stop of the process registered in the process registration information table, and a step S192 notifies the process in the temporary stop state that the process is executable.

On the other hand, if the contention level of the level change process is higher than the contention level of the process registration information table in the step S186, a step S194 judges whether or not the contention level of the level change process is higher than or equal to the forcibly endable level shown in FIG. 14. If the judgement result in the step S194 is NO, a step S196 sets the process having the low contention level and registered in the process registration information table shown in FIG. 20 to the temporary stop state, and a step S198 makes a temporary stop request to the above process having the low contention level. If the judgement result in the step S194 is YES, a step S200 notifies a forced end to the process registered in the process registration information table, and a step S202 deletes the corresponding information (data block) from the process registration information table. After the step S192, S198 or S202 or, if the judgement result in the step S178, S184 or S185 is NO, the process returns to the step S18 shown in FIG. 4.

Figure 24:
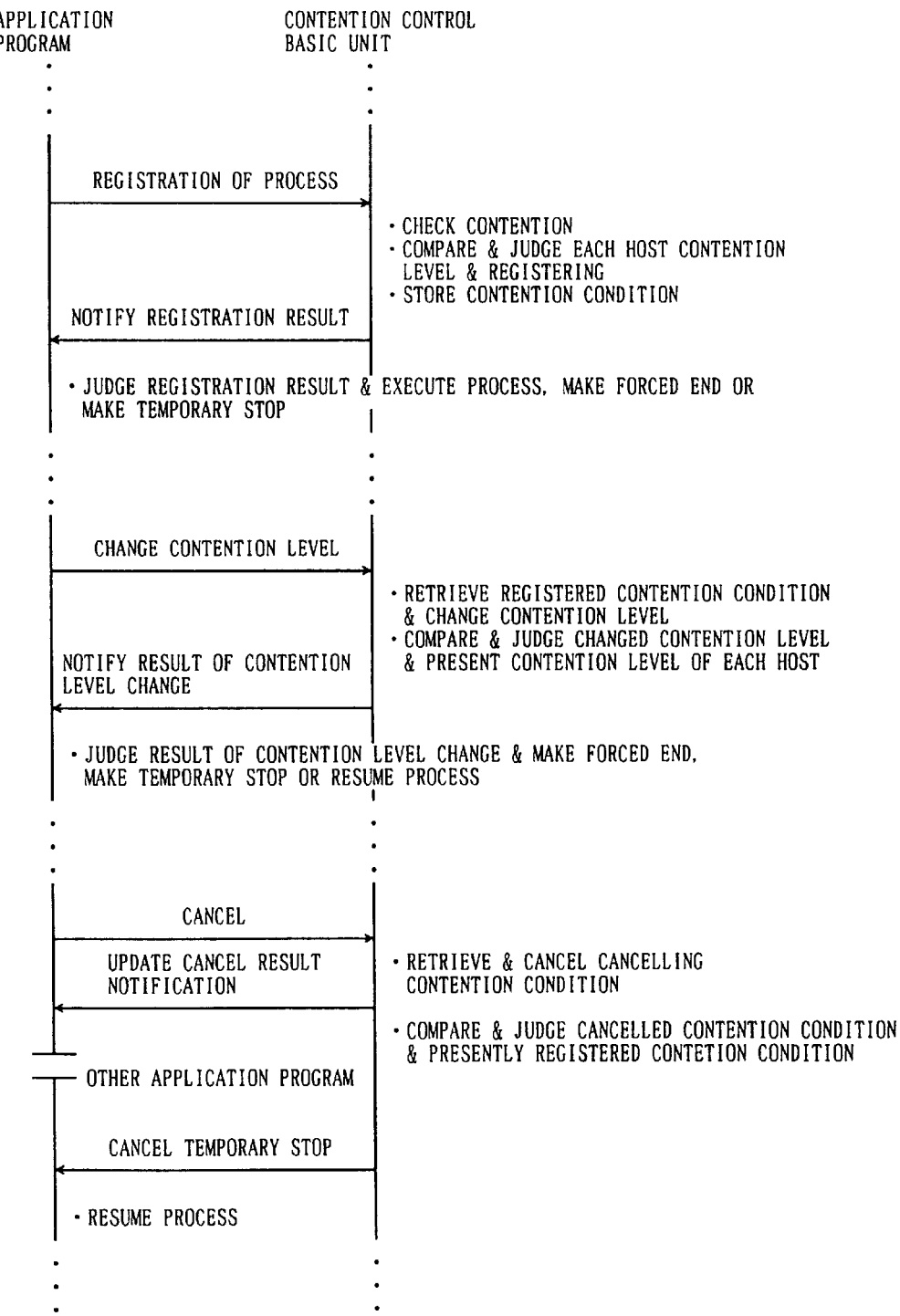
FIG. 24 is a diagram showing a contention process sequence.
Figure 25:
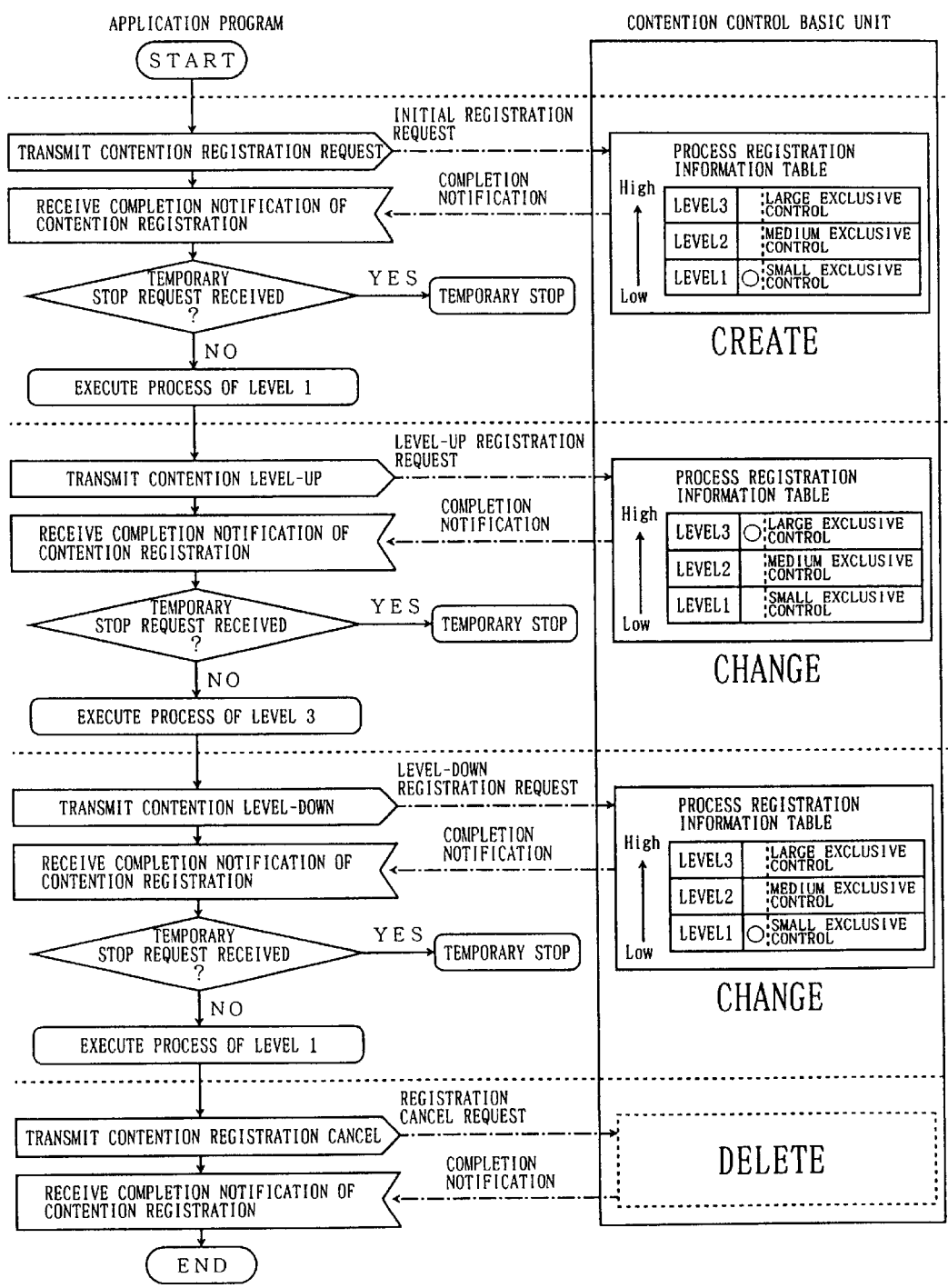
FIG. 25 is a diagram showing an embodiment of the contention process sequence.

FIG. 24 is a diagram showing a contention process sequence, and FIG. 25 is a diagram showing an embodiment of the contention process sequence. In FIGS. 24 and 25, when the registration of a process is made from the application program group 57, the contention control basic unit 52 checks the contention. More particularly, the contention control basic unit 52 compares the contention level of each host such as the SCPs $34_1$ through $34_4$ and the SMS 36 and the contention level of the process, registers the process in the process registration information table, and notifies the result of the registration to the process. The process is executed or is temporarily stopped depending on this notification. In addition, other processes are forcibly ended.

Next, when a contention level change request is received from the process, the contention control basic unit 52 changes the contention level of this process registered in the process registration information table, compares the changed contention level and the contention level of each host, and notifies a comparison result to this process. This process is executed, temporarily stopped or forcibly ended depending on this notification.

Thereafter, when a delete request is received from the process, the contention control basic unit 52 deletes this process from the process registration information table, and notifies the deletion to this process. In addition, the contention levels of the other processes registered in the process registration information table are compared, and if the temporary stop of a process can be cancelled, the cancellation of the temporary stop is notified to this process.

Figure 26:
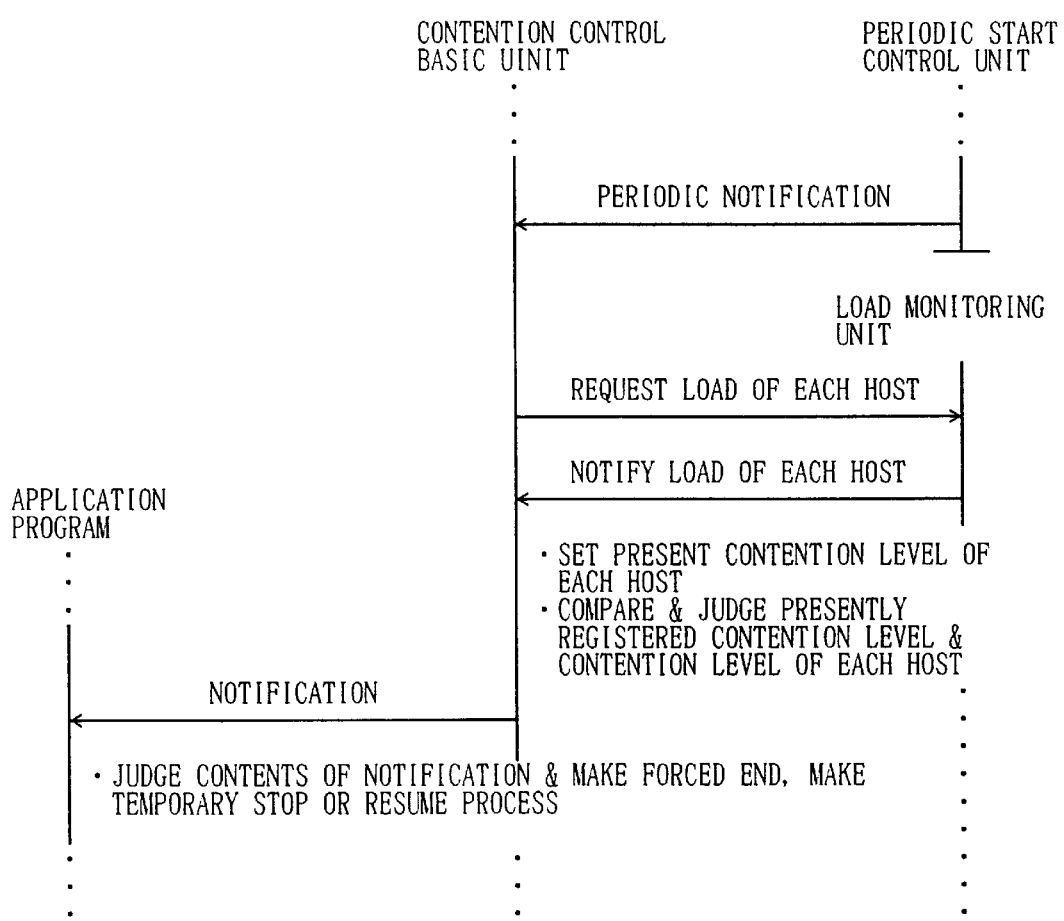
FIG. 26 is a diagram showing a load monitoring sequence.

FIG. 26 is a diagram showing a load monitoring sequence. In FIG. 26, when a periodic notification is received from the periodic start control unit 74, the contention control basic unit 52 requests the load monitoring unit 54 to notify the load state of each host, and sets the contention level of each host to the process registration information table in response to the notification of the load state. In addition, the contention control basic unit 52 compares the contention levels of each of the processes registered in the process registration information table, and notifies a comparison result to each of the processes. Each process is executed, forcibly ended or temporarily stopped depending on the notification.

Figure 27:
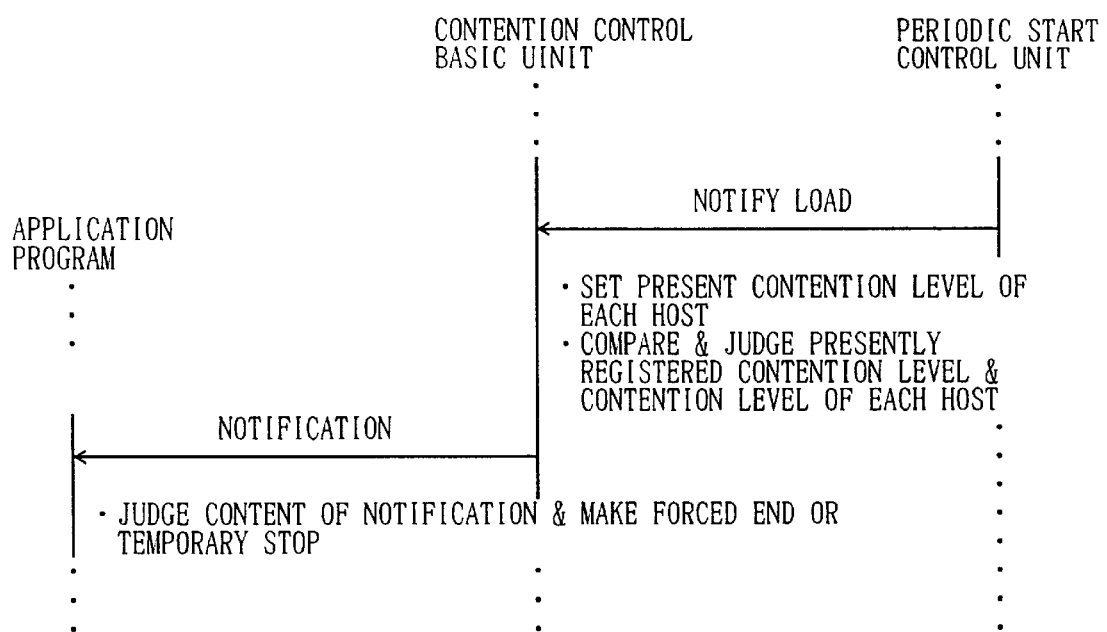
FIG. 27 is a diagram showing a load receiving sequence.

FIG. 27 is a diagram showing a load receiving sequence. In FIG. 27, when a load change notification is received from the load notification accept unit 56, the contention control basic unit 52 sets the contention levels of each of the hosts in the process registration information table. In addition, the contention control basic unit 52 compares the contention levels of each of the processes registered in the process registration information table, and notifies a comparison result to each of the processes. Each process is executed, forcibly ended or temporarily stopped depending on the notification.

Therefore, it is possible to centrally manage the processes of the SMS 36 and the plurality of SCPs $34_1$ through $34_4$ and to easily manage the contention relationships of the plurality of processes, because the contention of the plurality of processes is managed by providing the process registration information table which registers the information of the plurality of processes related to the plurality of SCPs $34_1$ through $34_4$ and the SMS 36 in the SMS 36.

Because the contention level of each process is registered in the process registration information table, it is possible to easily recognize which process is to be executed with a priority over others by comparing the contention levels of each of the processes. Further, since the contention level of each process in the process registration information table is changed depending on the request from each process, it is possible to vary the contention level depending on the progress of the process. Hence, it is possible to flexibly control the process such as not interrupting when a portion of the process is being executed.

In addition, the process information subject to the contention with the plurality of processes is provided in the SMS 36. For this reason, when a new process is added, it is possible to easily know the process subject to the contention from the above process information. Further, because the process information is rewritable, it is possible to flexibly cope with situations where the order of priority or the exclusive relationships of the processes is changed due to a change in the system structure or the like.

Moreover, the contention level information used to convert the loads of the plurality of SCPs $34_1$ through $34_4$ and the SMS 36 to the contention levels is provided in the SMS 36. Hence, it is possible to control the execution or temporary stop of the process depending on the load of each of the SSPs $30_1$ through $40_4$ and the SMS 36, and it is possible to prevent the service from being affected by the maintenance operation application. In addition, since the SMS 36 is provided with the load monitoring unit 54 which periodically monitors the loads of the plurality of SCPs $34_1$ through $34_4$ and the SMS 36, it is possible to carry out a process control with respect to the change in each of the SCPs $34_1$ through $34_4$ and the SMS 36. The SMS 36 is also provided with the load notification accept unit 56 which monitors the sudden change in the loads of the plurality of SCPs $34_1$ through $34_4$. Consequently, it is possible to carry out a process control depending on the sudden change in the load of each of the SSPs $30_1$ through $30_4$.

As various services become realizable in the intelligent network system, the system structure evolves, so that various services can be realized by the plurality of SCPs to suit the processing capabilities and the like of the SCPs, and so that the database managements of the plurality of SCPs can be realized by a single SMS. In this embodiment, measures are taken to prevent contradiction among the databases in such an evolved system structure, and to prevent an abnormality of the system state and service state of the SCPs. In other words, the master database is provided in the SMS, and the contention relationships of the various processes executed by the various units such as the SMS and the SCPs are checked in detail, so as to cope with the exclusive process and realize a satisfactory system operation efficiency.

With regard to the contention relationships of the processes, it is possible to carry out a detailed control of the contention by increasing or decreasing the level of the contention conditions depending on the extent of the progress of the process. In addition, even if the system structure, the structure of the service realized by the SCP and the like are arbitrary, it is possible to control the contention of the processes regardless of the structural differences.

As the system structure of the intelligent network system becomes more complex, it becomes more difficult for the operator to check the loads of the SCPs and the SMS and to manually restrict the operation. In addition, it is desirable to prevent the service from being affected by the maintenance operation application. But according to this embodiment, the generation of a new process is restricted, and the interruption or the like of the process which is being executed is automatically made depending on not only the simple contention relationships among the processes but also depending on the load state of each of the SCPs and the SMS, so that the effects on the services are minimized.

Further, the present invention is not limited to these embodiments, but various variations and modifications may be made without departing from the scope of the present invention.

What is claimed is:

1. A service management system adapted to an intelligent network system having a plurality of service switching points making service inquiries, and a plurality of service control points coupled to the service switching points and controlling services, said service management system comprising:

means, coupled to the plurality of service control points, for centrally managing databases of the service control points;

a process registration information table registering process information of a plurality of processes related to the service control points and the service management system, and contention levels of the processes; and a load monitoring unit periodically monitoring loads of the service control points and the service management system, said means using said process registration information table and the loads monitored by said load monitoring unit to manage contention among the processes.

2. The service management system as claimed in claim 1, which further comprises:

means for managing process information of each process subject to contention with respect to the processes.

3. The service management system as claimed in claim 2, which further comprises:

means for rewriting the process information.

4. The service management system as claimed in claim 1, which further comprises:

means for managing contention level information which is used to convert the loads of the service control points and the service management system monitored by said load monitoring unit to the contention levels.

5. The service management system as claimed in claim 4, which further comprises:

load notification accept unit monitoring a sudden change in the loads of the service control points.

6. The service management system as claimed in claim 1, which further comprises:

load notification accept unit monitoring a sudden change in loads of the service control points.

7. A process control system for an intelligent network system which includes a plurality of service switching points making service inquiries, a plurality of service control points coupled to the service switching points and controlling services, and a service management system coupled to the plurality of service control points and centrally managing databases of the service control points, said process control system comprising:

a process registration information table, provided in the service management system, registering process information of a plurality of processes related to the service control points and the service management system, and contention levels of the processes;

a load monitoring unit, provided in the service management system, periodically monitoring loads of the service control points and the service management system; and said service management system using said process registration information table to manage contention among the processes.

8. The process control system as claimed in claim 7, wherein said service management system further includes means for managing process information of each process subject to contention with respect to the processes.

9. The process control system as claimed in claim 8, wherein said service management system further includes means for rewriting the process information.

10. The process control system as claimed in claim 7, wherein said service management system further includes means for managing contention level information which is used to convert the loads of the service control points and the process control system monitored by said load monitoring unit to the contention levels.

11. The process control system as claimed in claim 12, wherein said service management system further includes load notification accept unit monitoring a sudden change in the loads of the service control points.

12. The process control system as claimed in claim 7, wherein said service management system further includes load notification accept unit monitoring a sudden change in loads of the service control points.

* * * * *